US010256977B2

(12) United States Patent
Weinstein et al.

(10) Patent No.: US 10,256,977 B2
(45) Date of Patent: Apr. 9, 2019

(54) METHODS AND SYSTEMS FOR EFFICIENT REPRESENTATION OF FILE SETS

(71) Applicant: Synopsys, Inc., Mountain View, CA (US)

(72) Inventors: Damon Alexander Weinstein, Arlington, MA (US); Randolph Byrd Kilmon, Jr., Wayland, MA (US)

(73) Assignee: Synopsys, Inc., Mountain View, CA (US)

( * ) Notice: Subject to any disclaimer, the term of this patent is extended or adjusted under 35 U.S.C. 154(b) by 330 days.

(21) Appl. No.: 14/182,699

(22) Filed: Feb. 18, 2014

(65) Prior Publication Data

US 2015/0234848 A1 Aug. 20, 2015

(51) Int. Cl.
*G06F 17/30* (2006.01)
*H04L 9/32* (2006.01)
*G06F 8/71* (2018.01)

(52) U.S. Cl.
CPC .............. *H04L 9/3239* (2013.01); *G06F 8/71* (2013.01); *G06F 17/30109* (2013.01); *G06F 17/30985* (2013.01)

(58) Field of Classification Search
USPC ................................................ 707/690, 698
See application file for complete search history.

(56) References Cited

U.S. PATENT DOCUMENTS

| | | | |
|---|---|---|---|
| 6,101,507 A | 8/2000 | Cane et al. | |
| 7,020,658 B1 * | 3/2006 | Hill | G06F 17/30067 |
| 7,124,408 B1 | 10/2006 | Parthasarathy et al. | |
| 7,908,276 B2 | 3/2011 | Dodge et al. | |
| 8,589,362 B1 | 11/2013 | Braam et al. | |
| 2005/0086241 A1 * | 4/2005 | Ram | G06F 17/30088 |
| 2005/0125524 A1 | 6/2005 | Chandrasekhar et al. | |
| 2006/0190988 A1 * | 8/2006 | Adams | G06F 21/6236 726/2 |
| 2007/0043747 A1 * | 2/2007 | Benton | G06F 17/30067 |

(Continued)

OTHER PUBLICATIONS

Godfrey, Michael et al., Using Origin Analysis to Detect Merging and Splitting of Source Code Entities, IEEE Transaction on Software Engineering, vol. 31, No. 2, 2005, 15 pgs.

(Continued)

*Primary Examiner* — Jau Shya Meng
(74) *Attorney, Agent, or Firm* — Sterne, Kessler, Goldstein & Fox P.L.L.C.

(57) ABSTRACT

Sets of files may be represented using signatures. As described, an audit system can scan a file hierarchy that includes a root directory and a plurality of elements (e.g., directories, data files, and archive files) to identify elements satisfying an element selection criteria. The audit system creates element descriptors by identifying, for each respective identified element, one or more element component values and creating an element descriptor from the element component values. The audit system forms a string descriptor comprising an aggregation of the element descriptors and generates a signature for the string descriptor. The signature may be stored in association with metadata for the root directory. The audit system can identify multiple sets of files represented by equivalent signatures and record the representations of the set of files compactly.

20 Claims, 10 Drawing Sheets

(56) References Cited

U.S. PATENT DOCUMENTS

| | | | |
|---|---|---|---|
| 2008/0140960 A1* | 6/2008 | Basler | G06F 11/1464 |
| | | | 711/162 |
| 2011/0283368 A1 | 11/2011 | Gasparri et al. | |
| 2013/0080485 A1 | 3/2013 | Pudipeddi et al. | |
| 2013/0191350 A1 | 7/2013 | Esaka et al. | |
| 2013/0198459 A1 | 8/2013 | Joshi et al. | |
| 2013/0263289 A1* | 10/2013 | Vijayan | G06F 21/60 |
| | | | 726/31 |
| 2015/0120663 A1* | 4/2015 | Le Scouarnec | H04L 67/10 |
| | | | 707/638 |

OTHER PUBLICATIONS

Barreto, Joao et al., Hash Challenges: Stretching the Limits of Compare-by-Hash in Distributed Data Deduplication Information Processing Letters, *Information Processing Letters*, Elsevier, vol. 112, No. 10, May 2012, 11 pgs.

Schwarz, Thomas et al., Low Cost Comparisons of File Copies, Proceedings of 10th Int. Conf. on Distributed Computing Systems, IEEE, May 1990, 7 pgs.

Jain, Navendu et al., TAPER: Tiered Approach for Eliminating Redundancy in Replica Synchronization, 4th Usenix Conf. on File and Storage Technologies, vol. 5, Dec. 2005, 14 pgs.

Buttler, David. A Short Survey of Document Structure Similarity Algorithms, in *International Conference on Internet Computing*, Jun. 2004, 7 pgs, Lawrence Livermore National Laboratory Livermore, CA 94550.

\* cited by examiner

Deep with Size —— 410

@Bravo.TXT:1061@@Charlie.EXE:54331@@Delta.ZIP:839@
Echo>@Foxtrot.DAT:1259@@Golf.DAT:3511@<Hotel>
@Foxtrot.DAT:1259@@Golf.DAT:5167@<India>Echo>
@Foxtrot.DAT:1259@@Golf.DAT:3511@<<Juliett><

⇨ 7D372393B8FA2DE84515C10C53CA2CA0 —— 412

Deep no Size —— 420

@Bravo.TXT@@Charlie.EXE@@Delta.ZIP@Echo>
@Foxtrot.DAT@@Golf.DAT@<Hotel>@Foxtrot.DAT@
@Golf.DAT@<India>Echo>@Foxtrot.DAT@@Golf.DAT@<<
Juliett><

⇨ 1D6DD05A7F026E1473E65ED1C31968C8 —— 422

Shallow with Size —— 430

@Bravo.TXT:1061@@Charlie.EXE:54331@@Delta.ZIP:839@
Echo><Hotel><India><Juliett><

⇨ C7487A9E24F5CDFCC4F8A7C1004BA236 —— 432

Shallow no Size —— 440

@Bravo.TXT@@Charlie.EXE@@Delta.ZIP@Echo><
Hotel><India><Juliett><

⇨ FDCE50E20AB32C51F9DE9CFD87C9E3DC —— 442

Figure 4A

METHODS AND SYSTEMS FOR EFFICIENT REPRESENTATION OF FILE SETS

BACKGROUND

Generally, computing devices store data as files in a data storage system. The data storage system stores and indexes the file content for later retrieval. The index is typically represented as a tree-like hierarchy of directories, also sometimes referred to as folders. Each directory represents a grouping of zero or more files and sub-directories. The hierarchy of directories has one root node (the only directory with no parent directory), zero or more intermediate nodes (sub-directories), and zero or more leaf nodes (files and/or directories with no sub-directories). A file hierarchy can be packaged (with or without compression) into an archive file, which resides in a file system like a file but contains files and sub-directories like a directory. Thus an archive can be viewed as a leaf node, as an intermediate node, or as both.

A set of files may be replicated within a data storage system or from one data storage system to another. In some instances, the replicated data is unchanged from copy to copy. In other instances, the replicated data is modified. The modifications may be as simple as a bit or two altered in one file or the modification may be more extensive. Generally, there are three types of modifications: changes to individual file contents, addition or deletion of files (including changes to file names), and addition or deletion of directories (including changes to directory names). However, even when there have been modifications in a replicated file hierarchy, the replica set of files may still have similarities to the original set of files.

SUMMARY

Aspects and implementations of the present disclosure are directed to methods and systems for representing sets of files using signatures. In general, in some implementations, an audit system scans a file hierarchy comprising a root directory and a plurality of elements (e.g., directories, data files, and archive files) to identify elements satisfying an element selection criteria. The audit system creates element descriptors by identifying, for each respective identified element, one or more element component values and creating an element descriptor from the element component values, e.g., according to specific element component formatting rules. The audit system forms a string descriptor comprising an aggregation of the element descriptors, e.g., according to string descriptor formatting rules, and generates a signature for the string descriptor. The signature can be a hash or digest of the string descriptor, e.g., using MD5, SHA-2, MurmurHash3, or any other such function. The signature may be stored in association with metadata for the root directory. In some implementations, the audit system identifies multiple sets of files represented by equivalent signatures and records the representations of the set of files compactly.

In one aspect, the disclosure relates to a method for representing a set of data files. In general, the method includes scanning, e.g., by an audit system comprising at least one computing processor, a file hierarchy comprising a root directory and a plurality of elements. Each element may be a directory, an archive file, or a data file (i.e., any file that isn't an archive file). The method includes identifying, by the audit system, from the scanned plurality of elements, one or more elements each satisfying an element selection criteria. The method includes creating, by the audit system, for each element in the identified one or more elements, a respective element descriptor by identifying, for any one element (a "first" element) in the identified one or more elements, a first element component value and creating a first element descriptor comprising a text string of the first element component value formatted according to one or more string descriptor formatting rules. The method includes forming, by the audit system, a string descriptor comprising a deterministic aggregation of the element descriptors created for the identified one or more elements and generating a signature for the string descriptor.

In some implementations of the method, the element selection criteria is satisfied by a first element when the first element has a name that is in a list of names to include or not in a list of names to exclude. In some implementations, the element selection criteria is satisfied by a first element when the first element has a name that is matched by a regular expression for names to include or not matched by a regular expression for names to exclude. In some implementations, the element selection criteria is specified in configuration data stored in a computer readable medium accessible by the at least one computing processor of the audit system. In some implementations, the element selection criteria is specified via a user interface. In some implementations, the element selection criteria is pre-defined for some types of signatures and configurable for other types of signatures.

In some implementations of the method, the first element component value is one of a data file name, an archive file name, and a directory name. In some implementations, the method includes identifying, for the first element in the identified one or more elements, a second element component value that is one of a data file size, an archive file size, and a number of directories between the element and the root directory. The first element descriptor can then comprise a text string of the first element component value and the second element component value formatted according to the one or more string descriptor formatting rules. In some implementations, any number of element component values can be included in the element descriptor. In some implementations, the element components to include in an element descriptor are specified in an element descriptor component list. In some implementations, one or more element descriptor component lists are specified in configuration data stored in a computer readable medium accessible by at least one computing processor of the audit system. In some implementations, the one or more string descriptor formatting rules are specified in configuration data stored in a computer readable medium accessible by at least one computing processor of the audit system.

In some implementations of the method, when the first element is a directory, the first element component value is a string descriptor for a scan of the directory. The string descriptor is of the same type as the string descriptor to be generated. In some implementations, when the first element is a directory, the first element component value is a signature for the string descriptor for a scan of the directory, where the string descriptor is of the same type as the string descriptor to be generated.

In some implementations of the method, the deterministic aggregation comprises ordering the respective string descriptors for the identified elements alphanumerically by respective element name. In some implementations, the ordering is determined by string descriptor formatting rules. In some implementations, the string descriptor formatting rules are specified in configuration data stored in a computer readable medium accessible by the at least one computing processor of the audit system.

In some implementations of the method, forming the signature comprises calculating a hash value of the string descriptor. In some implementations, the audit system calculates the hash value using one of: a cyclic redundancy check, a message digest, an MD5 hash function, a cryptographic hash, and a non-cryptographic hash function.

In some implementations, the method includes persisting one or more generated signatures in a data store. In some implementations of the method, the one or more generated signatures are persisted in the data store in association with metadata for the root directory represented by generated signatures. In some implementations of the method, the one or more generated signatures are persisted in the data store in association with an identifier for the root directory represented by generated signatures and/or in association with an identifier for an ancestor directory to the directory represented by generated signatures. In some implementations, the method includes identifying an existing signature in the data store equivalent to the generated signature and storing information in the data store associating a file hierarchy represented by the existing signature with the root directory scanned. In some implementations, the method includes identifying that the generated signature is present in the data store and updating the data store with an indicator for the root directory of the scan in association with the signature present in the data store.

In another aspect, the disclosure relates to a system for representing a set of data files. In general, the system includes one or more computing processors and memory storing instructions which, when executed by the one or more computing processors, cause the one or more processors to scan a file hierarchy comprising a root directory and a plurality of elements. Each element may be a directory, an archive file, or a data file. The one or more processors identify one or more elements, each satisfying an element selection criteria, from the scanned plurality of elements. The one or more processors of the system create, for each element in the identified one or more elements, a respective element descriptor by identifying, for any one element (a "first" element) in the identified one or more elements, a first element component value and creating a first element descriptor comprising a text string of the first element component value formatted according to one or more string descriptor formatting rules. The one or more processors form a string descriptor comprising a deterministic aggregation of the element descriptors created for the identified one or more elements and generate a signature for the string descriptor.

In some implementations of the system, the element selection criteria is satisfied by a first element when the first element has a name that is in a list of names to include or not in a list of names to exclude. In some implementations, the element selection criteria is satisfied by a first element when the first element has a name that is matched by a regular expression for names to include or not matched by a regular expression for names to exclude. In some implementations, the element selection criteria is specified in configuration data stored in a computer readable medium accessible by the at least one computing processor of the system. In some implementations, the element selection criteria is specified via a user interface. In some implementations, the element selection criteria is pre-defined for some types of signatures and configurable for other types of signatures.

In some implementations of the system, the first element component value is one of a data file name, an archive file name, and a directory name. In some implementations, the one or more processors of the system identify, for the first element in the identified one or more elements, a second element component value that is one of a data file size, an archive file size, and a number of directories between the element and the root directory. The first element descriptor can then comprise a text string of the first element component value and the second element component value formatted according to the one or more string descriptor formatting rules. In some implementations, any number of element component values can be included in the element descriptor. In some implementations, the element components to include in an element descriptor are specified in an element descriptor component list. In some implementations, one or more element descriptor component lists are specified in configuration data stored in a computer readable medium accessible by at least one computing processor of the system. In some implementations, the one or more string descriptor formatting rules are specified in configuration data stored in a computer readable medium accessible by at least one computing processor of the system.

In some implementations of the system, when the first element is a directory, the first element component value is a string descriptor for a scan of the directory. The string descriptor is of the same type as the string descriptor to be generated. In some implementations, when the first element is a directory, the first element component value is a signature for the string descriptor for a scan of the directory, where the string descriptor is of the same type as the string descriptor to be generated.

In some implementations of the system, the deterministic aggregation comprises ordering the respective string descriptors for the identified elements alphanumerically by respective element name. In some implementations, the ordering is determined by string descriptor formatting rules. In some implementations, the string descriptor formatting rules are specified in configuration data stored in a computer readable medium accessible by at least one computing processor of the system.

In some implementations of the system, forming the signature comprises calculating a hash value of the string descriptor. In some implementations, the one or more processors of the system calculates the hash value using one of: a cyclic redundancy check, a message digest, an MD5 hash function, a cryptographic hash, and a non-cryptographic hash function.

In some implementations of the system, the instructions, when executed, cause the one or more processors to persist one or more generated signatures in a data store. In some implementations of the system, the one or more generated signatures are persisted in the data store in association with metadata for the root directory represented by generated signatures. In some implementations of the system, the one or more generated signatures are persisted in the data store in association with an identifier for the root directory represented by generated signatures and/or in association with an identifier for an ancestor directory to the directory represented by generated signatures. In some implementations, the one or more processors of the system identify an existing signature in the data store equivalent to the generated signature and store information in the data store associating a file hierarchy represented by the existing signature with the root directory scanned. In some implementations, the one or more processors of the system identify that the generated signature is present in the data store and update the data store with an indicator for the root directory of the scan in association with the signature present in the data store.

In another aspect, the disclosure relates to tangible computer readable media storing instructions that, when executed by a computing system comprising one or more processors, cause the one or more processors to scan a file hierarchy comprising a root directory and a plurality of elements. Each element may be a directory, an archive file, or a data file. The instructions cause the one or more processors to identify one or more elements, each satisfying an element selection criteria, from the scanned plurality of elements. The instructions cause the one or more processors to create, for each element in the identified one or more elements, a respective element descriptor by identifying, for any one element (a "first" element) in the identified one or more elements, a first element component value and creating a first element descriptor comprising a text string of the first element component value formatted according to one or more string descriptor formatting rules. The instructions cause the one or more processors to form a string descriptor comprising a deterministic aggregation of the element descriptors created for the identified one or more elements and to generate a signature for the string descriptor.

In some implementations of the computer readable media, the element selection criteria is satisfied by a first element when the first element has a name that is in a list of names to include or not in a list of names to exclude. In some implementations, the element selection criteria is satisfied by a first element when the first element has a name that is matched by a regular expression for names to include or not matched by a regular expression for names to exclude. In some implementations, the element selection criteria is specified in configuration data stored either in the computer readable media or in another computer readable medium accessible by the computing system. In some implementations, the element selection criteria is specified via a user interface. In some implementations, the element selection criteria is pre-defined for some types of signatures and configurable for other types of signatures.

In some implementations of the computer readable media, the first element component value is one of a data file name, an archive file name, and a directory name. In some implementations, the instructions cause the one or more processors to identify, for the first element in the identified one or more elements, a second element component value that is one of a data file size, an archive file size, and a number of directories between the element and the root directory. The first element descriptor can then comprise a text string of the first element component value and the second element component value formatted according to the one or more string descriptor formatting rules. In some implementations, any number of element component values can be included in the element descriptor. In some implementations, the element components to include in an element descriptor are specified in an element descriptor component list. In some implementations, one or more element descriptor component lists are specified in configuration data stored in either the computer readable media or in another computer readable medium accessible by the computing system. In some implementations, the one or more string descriptor formatting rules are specified in configuration data stored either in the computer readable media or in another computer readable medium accessible by the computing system.

In some implementations of the computer readable media, when the first element is a directory, the first element component value is a string descriptor for a scan of the directory. The string descriptor is of the same type as the string descriptor to be generated. In some implementations, when the first element is a directory, the first element component value is a signature for the string descriptor for a scan of the directory, where the string descriptor is of the same type as the string descriptor to be generated.

In some implementations of the computer readable media, the deterministic aggregation comprises ordering the respective string descriptors for the identified elements alphanumerically by respective element name. In some implementations, the ordering is determined by string descriptor formatting rules. In some implementations, the string descriptor formatting rules are specified in configuration data stored either in the computer readable media or in another computer readable medium accessible by the computing system.

In some implementations of the computer readable media, forming the signature comprises calculating a hash value of the string descriptor. In some implementations, the one or more processors of the system calculates the hash value using one of: a cyclic redundancy check, a message digest, an MD5 hash function, a cryptographic hash, and a non-cryptographic hash function.

In some implementations of the computer readable media, the instructions, when executed, cause the one or more processors to persist one or more generated signatures in a data store. In some implementations of the computer readable media, the one or more generated signatures are persisted in the data store in association with metadata for the root directory represented by generated signatures. In some implementations, the one or more generated signatures are persisted in the data store in association with an identifier for the root directory represented by generated signatures and/or in association with an identifier for an ancestor directory to the directory represented by generated signatures. In some implementations, the instructions cause the one or more processors of the computing system to identify an existing signature in the data store equivalent to the generated signature and store information in the data store associating a file hierarchy represented by the existing signature with the root directory scanned. In some implementations, the instructions cause the one or more processors to identify that the generated signature is present in the data store and update the data store with an indicator for the root directory of the scan in association with the signature present in the data store.

BRIEF DESCRIPTION OF THE DRAWINGS

The above and related objects, features, and advantages of the present disclosure will be more fully understood by reference to the following detailed description, when taken in conjunction with the following figures, wherein:

FIGS. 4A-4C are illustrative string descriptors and signatures for the example file hierarchy of FIG. 3;

Like reference numbers and designations in the various drawings indicate like elements.

DETAILED DESCRIPTION

Implementations described generally related to creating signatures for file hierarchies. These signatures have a variety of uses including, as described herein, using the signatures to identify similarities and/or differences between potentially redundant or similar file hierarchies.

Generally, two files may be compared by stepping through them one bit at a time, or one block of bits at a time, until two bits, or two blocks of bits, fail to match. If all the bits match, the files are equivalent. Comparing large files or comparing a large number of files using this process can be time consuming. The process may be accelerated by generating a signature for each file that is unlikely to be produced by a non-matching file. For example, the binary data of a file may be treated as an input value to a hash function and the resulting hash value may be used as a signature for the file. Hash functions typically produce an output of fixed size regardless of the input size and always produce the same output for the same input. If two files have different signatures (e.g., different hash values) then the two files are themselves different. Typically, hash functions are chosen such that minor changes to the file will result in a very different hash value. Thus, where the hash function is well selected, it is unlikely that two non-equivalent files of the same size will have the same signature. However, generating the hash value of a file requires processing the entire file.

As described in more detail herein, signatures may be efficiently generated for sets of files. A signature for a first set of files may be compared to a signature for a second set of files. If the two signatures match, it is likely that the sets of files are equivalent. Further analysis can confirm the equivalence, if required. In some implementations, the signatures are small fixed size values that are used to compress representation of highly redundant data sets.

Figure 1:
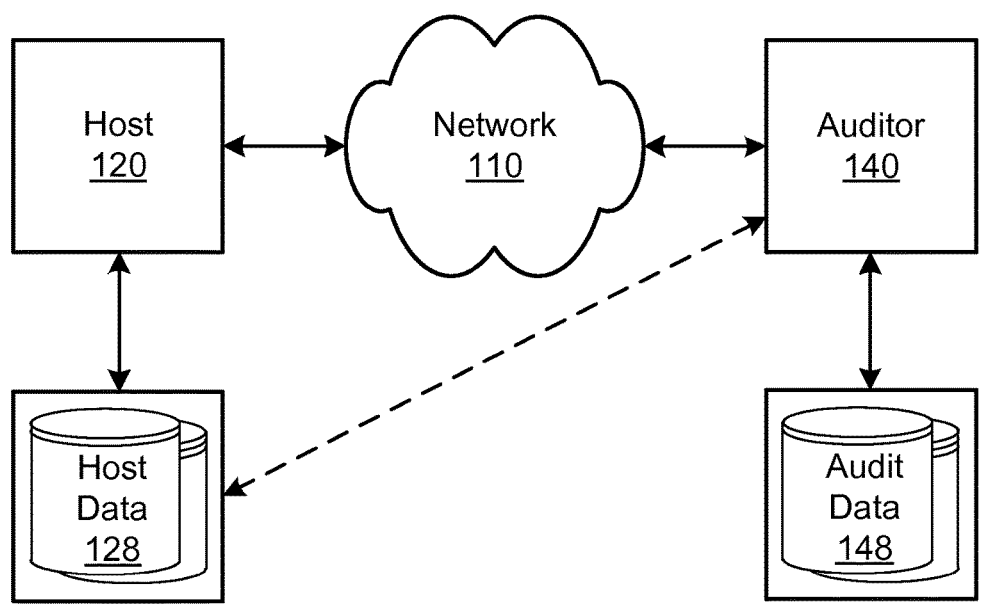
FIG. 1 is a block diagram of an implementation of a system configuration consistent with the disclosed methods and systems.

FIG. 1 is a block diagram of an implementation of a system configuration consistent with the disclosed methods and systems. Illustrated is a network 110 facilitating communication between a host computing system 120 and an auditor 140. The host computing system 120 stores files in a host data storage system 128. The files are analyzed by the auditor 140. The auditor 140 stores data for use in the audit in an audit data storage system 148.

Although illustrated as distinct computing systems and storage systems, the host computing system 120 may include the host data storage system 128 and the auditor 140 may include the audit storage system 148. Furthermore, the host computing system 120 may include the auditor 140, such that the network 110 might not be used.

Figure 2:
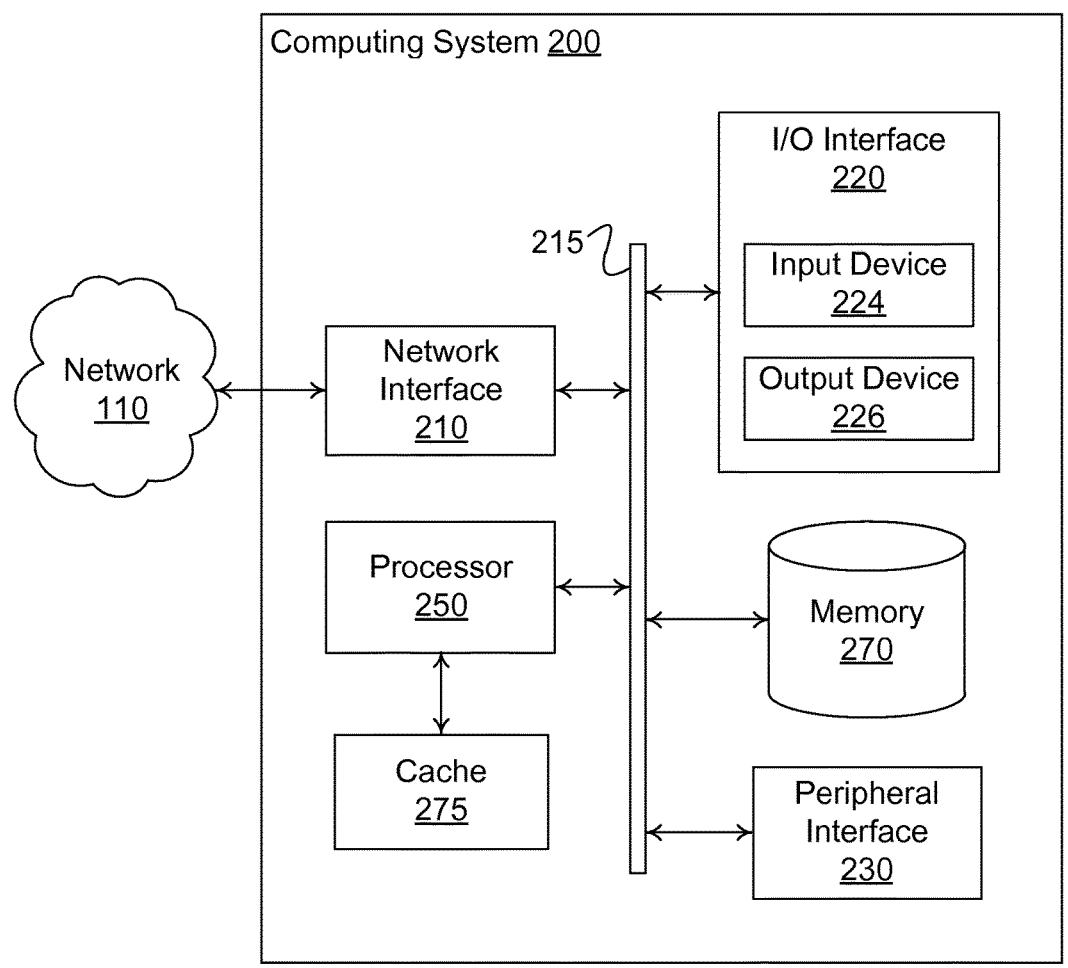
FIG. 2 is a block diagram of a computing system in accordance with an illustrative implementation.

Generally, a host computing device 120 is used to manage or access the set of files to be analyzed, e.g., in a host data storage system 128. The host computing device 120 may be a computing device or software executing on a computing device. The host computing device 120 may be virtualized. The host computing device 120 may be cloud-based. The host computing device 120 may be multiple computing devices working collaboratively. Illustrative examples of a host computing device 120 include, but are not limited to, a laptop, desktop, tablet, electronic pad, personal digital assistant, smart phone, video game device, television, kiosk, or portable computer. FIG. 2, described below, illustrates a computing device 200 that may be used as a host computing device 120.

Figure 3:
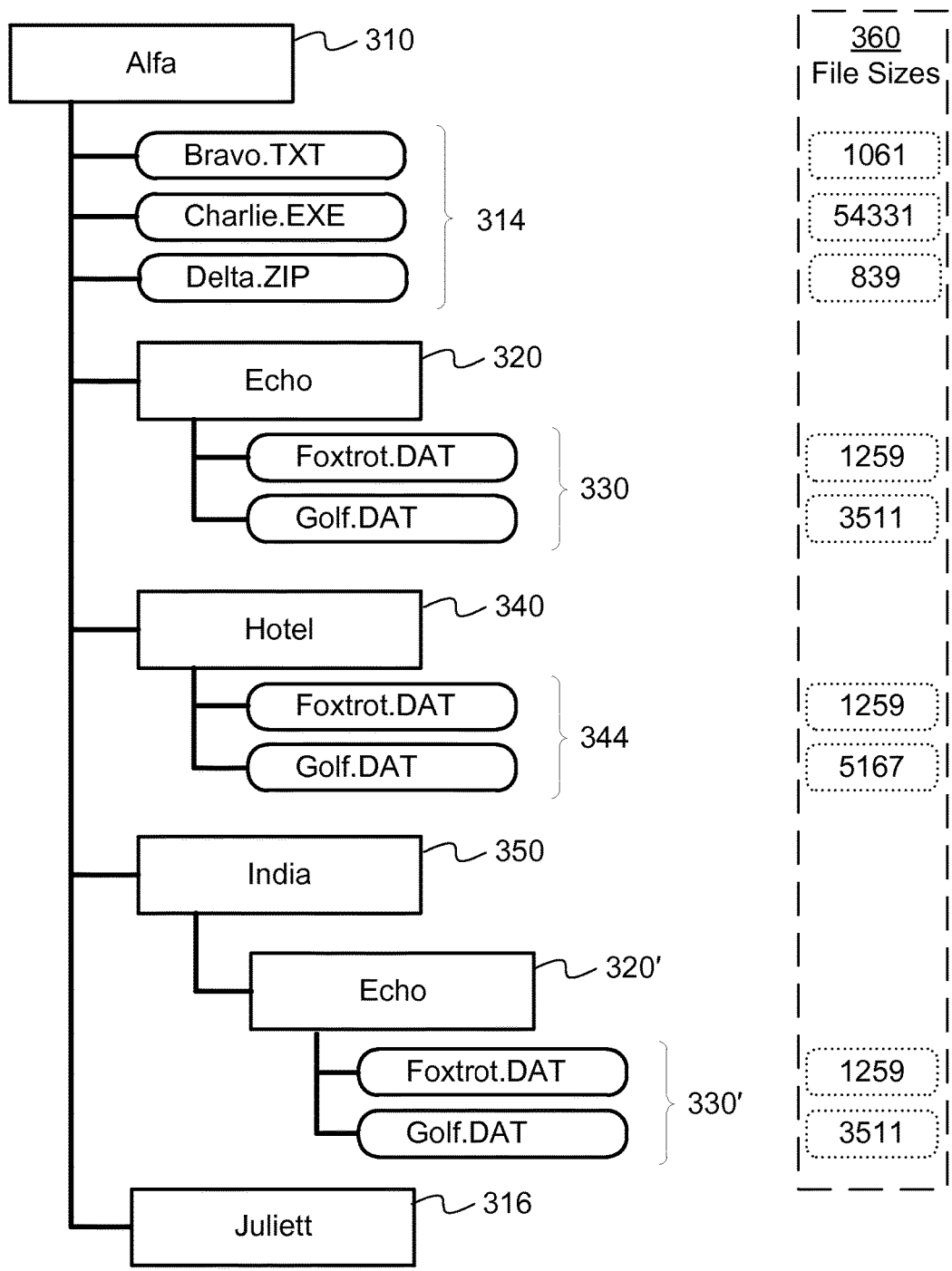
FIG. 3 is a block diagram of an illustrative example file hierarchy.

Generally, an auditor 140 is used to analyze or scan the set of files managed by the host computing device 120. The auditor 140 may be a computing device or software executing on a computing device. The auditor 140 may be virtualized. The auditor 140 may be cloud-based. The auditor 140 may be multiple computing devices working collaboratively. In some implementations, the auditor 140 scans files stored by the host computing device 120 and stores information about the directories and files of the file hierarchy. The scan information may be stored in an audit data storage device 148. In some implementations, the auditor 140 compares files stored by the host computing device 120 to other files stored by the host computing device 120. In some implementations, the auditor 140 compares files stored by the host computing device 120 to files previously analyzed or reviewed by an auditor 140. These files, or signatures for these files, may be stored by an audit data storage device 148. In some implementations, the auditor 140 compares files stored by the host computing device 120 to files stored by a second host computing device (not illustrated), either concurrently or by use of data stored in an audit data storage device 148. The auditor 140 may be distinct from the host computing device 120 or implemented as part of the host computing device 120. FIG. 2, described below, illustrates a computing device 200 that may be used as an auditor 140. FIG. 3, described below, illustrates a file hierarchy that might be scanned or analyzed and FIGS. 4A-4C, described below, illustrate some of the signatures and string descriptors (signatures "in the clear") that can be generated by the auditor 140.

The network 110 is a network facilitating the interactions between computing devices, e.g., between a host computing device 120 and an auditor 140. An illustrative network 110 is the Internet; however, other networks may be used. The network 110 may also be described as a data network or as a communication network and may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some implementations, there are multiple networks 110 between computing devices. The network 110 may be public, private, or a combination of public and private networks. The topology of the network 110 may be a bus, star, ring, or any other network topology capable of the operations described herein. The network 110 can be used for communication between a host computing device 120 and an auditor 140.

As described, the host computing device 120 stores the files in a host data storage system 128. The host data storage system 128 may use internal data storage devices, external local data storage devices, and/or networked data storage devices. Likewise, the auditor 140 stores information in an audit data storage system 148. The audit data storage system 148 may use internal data storage devices, external local data storage devices, and/or networked data storage devices.

Data storage devices may be volatile or non-volatile storage, hard drives, network attached storage, or storage area networks. Data storage devices may incorporate one or more mass storage devices for storing data, e.g., magnetic, magneto optical disks, or optical disks. Devices suitable for storing data include all forms of non-volatile memory, media and memory devices, including by way of example semiconductor memory devices, e.g., EPROM, EEPROM, and flash memory devices, magnetic disks, e.g., internal hard disks or removable disks, and optical discs, e.g., CD ROM, DVD-ROM, and Blu-Ray™ discs. Data storage devices may be virtualized. Data storage devices may be accessed via an intermediary server and/or via a network 110. Data storage devices may structure data as a database, e.g., as a relational database. Data storage devices may structure data as a collection of files, data blocks, or chunks. Data storage devices may provide for error recovery using, for example, redundant storage and/or error recovery data (e.g., parity bits).

FIG. 2 is a block diagram of a computing system 200 suitable for use in implementing the computerized components described herein. The essential elements of a computing system are a processor for performing actions in accordance with instructions and one or more memory devices for storing instructions and data. The illustrative computer system 200 includes one or more processors 250 in communication, via a bus 215, with an optional network interface 210 (in communication with the network 110), optional I/O interfaces 220 (e.g., for interacting with a user or administrator), and memory 270. Generally, a processor 250 will receive instructions and data from a read only memory or a random access memory or both. The processor 250 illustrated incorporates, or is directly connected to, additional cache memory 275. In some uses, additional components are in communication with the computer system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 are integrated into the same hardware, for example, as in a touch screen.

The processor 250 may be any logic circuitry that processes instructions, e.g., instructions fetched from the memory 270 or cache 275. In many implementations, the processor 250 is a microprocessor unit or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Examples of an output device 226 include a video display, television, touch screen, speaker, braille terminal, printer, or 3D printer. In some implementations, an input device 224 and/or output device 226 may function as a peripheral device connected via a peripheral interface 230.

A peripheral interface 230 supports connection of additional peripheral devices to the computing system 200. The peripheral devices may be connected physically, e.g., via FireWire or universal serial bus (USB), or wirelessly, e.g., via Bluetooth®. Examples of peripherals include keyboards, pointing devices, display devices, braille terminals, audio devices, hubs, printers, media reading devices, storage devices, hardware accelerators, sound processors, graphics processors, antennae, signal receivers, sensors, measurement devices, and data conversion devices. In some uses, peripherals include a network interface and connect with the computer system 200 via the network 110 and the network interface 210. For example, a printing device may be a network accessible printer.

The computer system 200 can be any workstation, desktop computer, laptop or notebook computer, server, blade, handheld computer, tablet, mobile telephone or other portable telecommunication device, media playing device, a gaming system, mobile computing device, or any other type and/or form of computing, telecommunications or media device that has sufficient processor power and memory capacity to perform the operations described herein. For example, the computer system 200 may comprise a tablet device such as one of the Nexus family of devices manufactured by Google Inc. of Mountain View, Calif. or one of the iPad family of devices manufactured by Apple Computer of Cupertino, Calif.

Implementations of the subject matter and the operations described herein can be implemented in digital electronic circuitry, or in computer software embodied on a tangible medium, firmware, or hardware, including the structures disclosed herein and their structural equivalents, or in combinations of one or more of them. Implementations of the subject matter described herein can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory. The operations described in this specification can be implemented as operations performed by a data processing apparatus on data stored on one or more computer-readable storage devices or received from other sources.

Different computing systems may implement slightly different file systems. Some file systems refer to directories as folders. Some file systems treat directories as though they were files. Some file systems include special sub-directories in a directory, e.g., a sub-directory pointing to the directory's parent (e.g., in Microsoft systems this is the "." directory). Generally, special directories of this nature are omitted from string descriptors and signatures. Some file systems treat archival files (e.g., ZIP files) as directories. The metadata available in a file system varies. For the purposes described herein, consistent treatment of directories can avoid complications of working with different file systems.

FIG. 3 is a block diagram of an example file hierarchy for purposes of illustration. A parent directory 310 is illustrated as a root node for various files 314, 330, 344, 330', and sub-directories 320, 340, 350, 320', 316. A table of files sizes 360 is also illustrated, with each file size on the right corresponding to the file illustrated to the left.

The parent directory 310 is labeled "Alfa" as an example directory name. The Alfa directory 310 includes three files 314 and four sub-directories 320,340,350, 316. The sub-directories may be recursively expanded, e.g., revealing that sub-directory India 350 includes a deeper sub-directory Echo 320'. The parent directory 310 illustrated may be a root node for the file system or may itself be a sub-directory of a grand-parent directory not illustrated.

The various files 314, 330, 344, 330', may be empty or may contain data. The files are labeled with various example file names that include extensions, although no such extensions are required and those illustrated are merely included as examples. The files are also assigned sizes in a table 360 on the right-hand side of FIG. 3. The files are named and sized merely for illustrative purposes and the labels are used in the example string descriptors shown in FIGS. 4A-4C.

The various directories 310, 320, 340, 350, 320', 316, may be empty, may contain data, and may contain sub-directories. Directory Juliett 316, for example, is illustrated with no files therein. Directory India 350, for example, is illustrated with a sub-directory Echo 320' therein. The root directory, Alfa 310, is a parent directory for each of the first tier directories, 320, 340, 350, 316, and a grand-parent directory for deeper tier directories, e.g., Echo 320'. The directories are labeled with various example directory names. The directories are not illustrated with sizes. The sizes in the table 360 on the right-hand side of FIG. 3 correspond to the files illustrated. The directories are named merely for illustrative purposes and the labels are used in the example string descriptors shown in FIGS. 4A-4C.

The files and directories illustrated are labeled as follows: The files 314 in directory Alfa 310 are labeled Bravo.TXT (size 1061), Charlie.EXE (size 54331), and Delta.ZIP (size 839); the files 330 in directory Echo 320 are labeled Foxtrot.DAT (size 1259) and Golf.DAT (size 3511); the files 344 in directory Hotel 340 are labeled Foxtrot.DAT (size 1259) and Golf.DAT (size 5167); the files 330' in directory Echo 320', illustrated as a sub-directory of directory India 350, are labeled Foxtrot.DAT (size 1259) and Golf.DAT (size 3511); and no files are illustrated in directory Juliet 316.

The table of files sizes 360 lists a number for each file where the number represents the size of the file to the immediate left in FIG. 3. Because FIG. 3 is merely an illustrative diagram of a file hierarchy, these file sizes do not have units. In some implementations, the file size unit is consistent throughout the implementation and therefore need not be specified. In some implementations, file size units specified explicitly. Generally, file sizes may be measured in units of bytes, kilobytes, megabytes, or any other unit of file size. In some implementations, file sizes are measured with the best precision consistently available. In some implementations, file sizes are consistently measured in bytes. The directories illustrated in FIG. 3 have not been assigned sizes; where directory sizes are used, the sum of the file sizes contained therein is used.

Generally, metadata and descriptive information about each directory and/or file may be identified. The identified information may include one or more of: sub-directory name, sub-directory size, number of files and/or sub-directories within a directory, file name, file size, security attributes, and archival status. File or directory names may be full form and/or truncated to so-called "short" form (e.g., the 8.3 format historically used in older operating systems like MS DOS). File names can be normalized to lower-case or upper-case. The descriptive information may include date and time information including creation date, last modified date, and/or last accessed date. Various metadata may be used as descriptive information. The descriptive information may be stored as metadata. In the implementations illustrated, only the sub-directory names, file names, and file sizes are shown; however, other implementations can make use of the various additional descriptive information described here. The descriptive information may be persistently stored in a database, e.g., at an audit data storage system 148. The descriptive information may be used to form signatures and then discarded. In some implementations, some of the information gathered is retained while other information is discarded. Storage of descriptive information is described in more detail below, in reference to storing signatures.

A file hierarchy can be described using one or more string descriptors representing metadata or descriptive information about the files in a directory. The term "signature" is generally used herein to indicate a digest or hash version of a string descriptor, as described below. However, the string descriptor itself is also a signature "in the clear" for the directory. Generally, as described herein, multiple string descriptors are created for the same directory within a file hierarchy, with each string descriptor representing a different granularity of descriptive information for the particular directory. Each directory in a hierarchy is scanned, resulting in a plurality of signatures. The digests or hashes for each of the multiple string descriptors are the multiple signatures associated with the file hierarchy. The following table (Table 1) provides illustrative string descriptor combinations as examples:

TABLE 1

| | | Signature Types: | | |
|---|---|---|---|---|
| Nickname | Element Selection Criteria | Element Descriptor Components | Element Descriptor Format | String Descriptor Format |
| "Deep with Size" | Every data file, archive file, and subdirectory, with each subdirectory recursively expanded; i.e.: ** **/* | Data File: Name & Size Archive: Name & Size Directory: Name & String Descriptor | Data File: @Name:Size@ Archive: @Name:Size@ Directory: Name>String Descriptor< Empty Directory: Name>< | Concatenate element descriptors alphanumerically by name within each directory. |
| "Deep No Size" | Every data file, archive file, and subdirectory, with each subdirectory recursively expanded; i.e.: ** **/* | Data File: Name Archive: Name Directory: Name & String Descriptor | Data File: @Name@ Archive: @Name@ Directory: Name>String Descriptor< Empty Directory: Name>< | Concatenate element descriptors alphanumerically by name within each directory. |

TABLE 1-continued

Signature Types:

| Nickname | Element Selection Criteria | Element Descriptor Components | Element Descriptor Format | String Descriptor Format |
|---|---|---|---|---|
| "Shallow with Size" | Every data file, archive file, and subdirectory, without expanding any subdirectories; i.e.: ** **/* | Data File: Name & Size Archive: Name & Size Directory: Name | Data File: @Name:Size@ Archive: @Name:Size@ Directory: Name>< | Concatenate element descriptors alphanumerically by name. |
| "Shallow No Size" | Every data file, archive file, and subdirectory, without expanding any subdirectories; i.e.: ** **/* | Data File: Name Archive: Name Directory: Name | Data File: @Name@ Archive: @Name@ Directory: Name>< | Concatenate element descriptors alphanumerically by name. |
| "Structure Only" or "Deep Structure" | Every subdirectory, with each subdirectory recursively expanded; i.e.: **/* | Data File: N/A Archive: N/A Directory: Name & "Structure Only" String Descriptor | Data File: N/A Archive: N/A Directory: Name>String Descriptor< Empty Directory: Name>< | Concatenate directory descriptors alphanumerically by name within each directory. |
| "Shallow Structure" | Every subdirectory, with each subdirectory recursively expanded to a depth N (default of N = 1); i.e.: **/* | Data File: N/A Archive: N/A Directory: Name & "Structure Only" String Descriptor up to N levels deep | Data File: N/A Archive: N/A Directory: Name>String Descriptor< $N^{th}$ Directory: Name>< Empty Directory: Name>< | Concatenate directory descriptors alphanumerically by name within each directory. |
| "Constellation" | Element selection and Element Descriptor Components are Configurable. (See Table 2) Element Size is optional. | | Data File: @Name:Size@ or @Name@ Archive: @Name:Size@ or @Name@ Directory: Name>String Descriptor Empty Directory: Name>< | Concatenate element descriptors alphanumerically by name within each directory. |

Table 1 shows six types of signatures, which are referenced throughout this description by the nicknames indicated. Shown are "Deep with Size," "Deep no Size," "Shallow with Size," "Shallow no Size," "Structure Only," "Shallow Structure," and "Constellation." For each type, Table 1 shows the Element Selection Criteria for determining which elements from a scanned directory to include in the signature. Table 1 shows the element descriptor components used to describe the selected elements (i.e., the elements that satisfied the selection criteria) and the element descriptor format used to represent the element descriptor components. The element descriptor components may be specified in an element descriptor component list for elements of each type (e.g., data file, archive file, or directory); the element descriptor component list may be specified in a configuration setting or file. In some implementations, there is a single "file" type for data files and archive files. In some implementations, there are separate types for data files and for archive files. In some implementations, there are more specific types distinguishing between types of data files, e.g., image files, text files, media files, etc. The format rules may be specified in a configuration setting or file. The format rules shown are not meant to be limiting and are merely an example; any consistent format can be used. The element descriptor components are concatenated in a deterministic ordering to form a string descriptor, which is the signature in the clear.

The "Deep with Size," "Deep no Size," and "Structure Only" signatures shown in Table 1 represent recursively expanded subdirectories. Each subdirectory is scanned and represented in the respective signature using the signature's rules. In the "Deep with Size" and "Deep no Size" signatures the data files and archive files in each directory are named and, in the "Deep with Size" signature, the respective file size is indicated. In some implementations, at any level of a file hierarchy tree, the contents of a sub-directory may be represented in the string descriptor as a signature for the sub-directory. In some implementations, the subdirectory signatures are represented in the string descriptor in hash or digest form. In some implementations, in some signatures, an archive file is treated as a subdirectory and any directories within the archive file are expanded.

The "Shallow with Size" and "Shallow no Size" signatures shown in Table 1 represent only a single directory. Subdirectories are named, but the contents are not represented in the respective shallow signature. The data files and archive files in the directory are named and, in a "Shallow with Size" signature, the respective file size is indicated.

In some implementations, a controlled-depth signature (e.g., "Shallow Structure") is used in which the subdirectories for a Shallow signature are expand up to a predetermined depth. That is, a "Controlled with Size" or "Controlled no Size" (not shown in Table 1) expands subdirectories nested up to N directories deep. In some implementations, the subdirectory signatures are represented in the string descriptor in hash or digest form. In some implementations, an archive file is treated as a subdirectory and any directories within the archive file are expanded.

The "Constellation" signatures shown in Table 1 allow for specialized configurable signatures. In some implementations, an interface or control file allows for specific control over the inclusion or exclusion of directories and files in a string descriptor, e.g., in a Constellation signature. In some implementations, rules specifying one or more Constellation signature types are stored in a configuration file. Table 2, below, shows example rules for a Constellation signature specialized for Java packages. Use of these Constellation signature rules results in the same signature for a Java source code tree and for a compiled Java package. An example using and illustrating this type of Constellation signature is presented in more detail below, in reference to FIG. 4D.

FIG. 3. FIG. 4D illustrates an example string descriptor and signature for two other example file hierarchies. In some implementations, one or more symbols are used as separators and to denote directory depth, e.g., using commas, semicolons, parentheses, and/or slash marks. In some implementations, string descriptor formatting rules contain symbols both to represent delimiters for appending element descriptors together as well as to indicate levels of nesting depth.

In FIGS. 4A-4D, the string descriptor are illustrated using element descriptor format rules as follows: File names for data files and archive files are joined with file size using a colon (":"); the file name and file size pair (or just the file name when sizes are omitted) are bounded by at symbols ("@", also called the commercial at symbol); a sub-directory name is followed by a greater-than sign (">") and a list of element descriptors for the contents of the sub-directory, the list terminated by a less-than sign ("<"). These element descriptor format rules mirror the example rules shown in Table 1, above. Any consistent set of element descriptor format rules may be used.

FIG. 4A illustrates a "Deep with Size" string descriptor 410 representing the file hierarchy illustrated in FIG. 3 using

TABLE 2

Example Constellation Rules (Java Example):

| Nickname | Element Selection Criteria | Element descriptor components | Element Descriptor Format | String Descriptor Format |
|---|---|---|---|---|
| "Java Constellation" | Every data file with a ".java" or ".class" file extension, unless the file has a dollar sign ("$") in the name, and subdirectories, with each subdirectory recursively expanded; i.e.: \*\*/\*.java, \*\*/\*.class, excluding \*\*/\*\$\*.class | Data File: Name minus file extension Archive: N/A Directory: Name & String Descriptor | Data File: @Name@ (with the extension removed) Archive: N/A Directory: Name>String Descriptor< Empty Directory: Name>< | Concatenate element descriptors alphanumerically by name within each directory. |

The term "signature" is generally used herein to indicate a digest or hash version of a string descriptor. Each string descriptor type, e.g., as described in Table 1 above, is a signature "in the clear" for the directory scanned and a signature is generated by taking a digest or hash of the string descriptor. This is a digest or hash of select file metadata (as specified by the element descriptor component list), not the actual binary content of the file. Signatures may be produced, for example, by calculating a Cyclic Redundancy Check (CRC) value, computing a Message-Digest such as MD5 (see, e.g., RFC 1321), calculating a cryptographic hash such as a Secure Hash Algorithm (e.g., SHA-1, SHA-2, etc.), or calculating a non-cryptographic hash such as any of the CityHash functions (e.g., CityHash128) or MurmurHash3. In the examples used herein, signatures are illustrated as the 512 bits of an MD5 digest written out in hexadecimal notation. However, any digest or hash with reasonably low collision rates may be used.

Figure 4B:
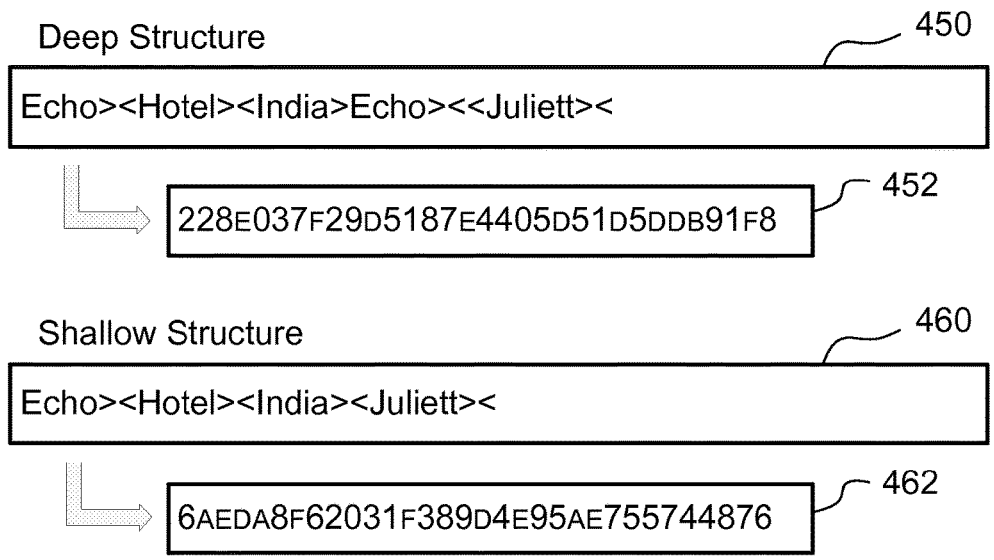
Figure 4C:
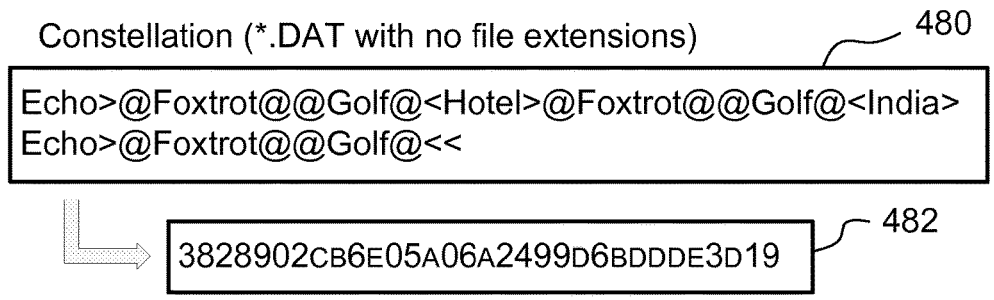
Figure 4D:
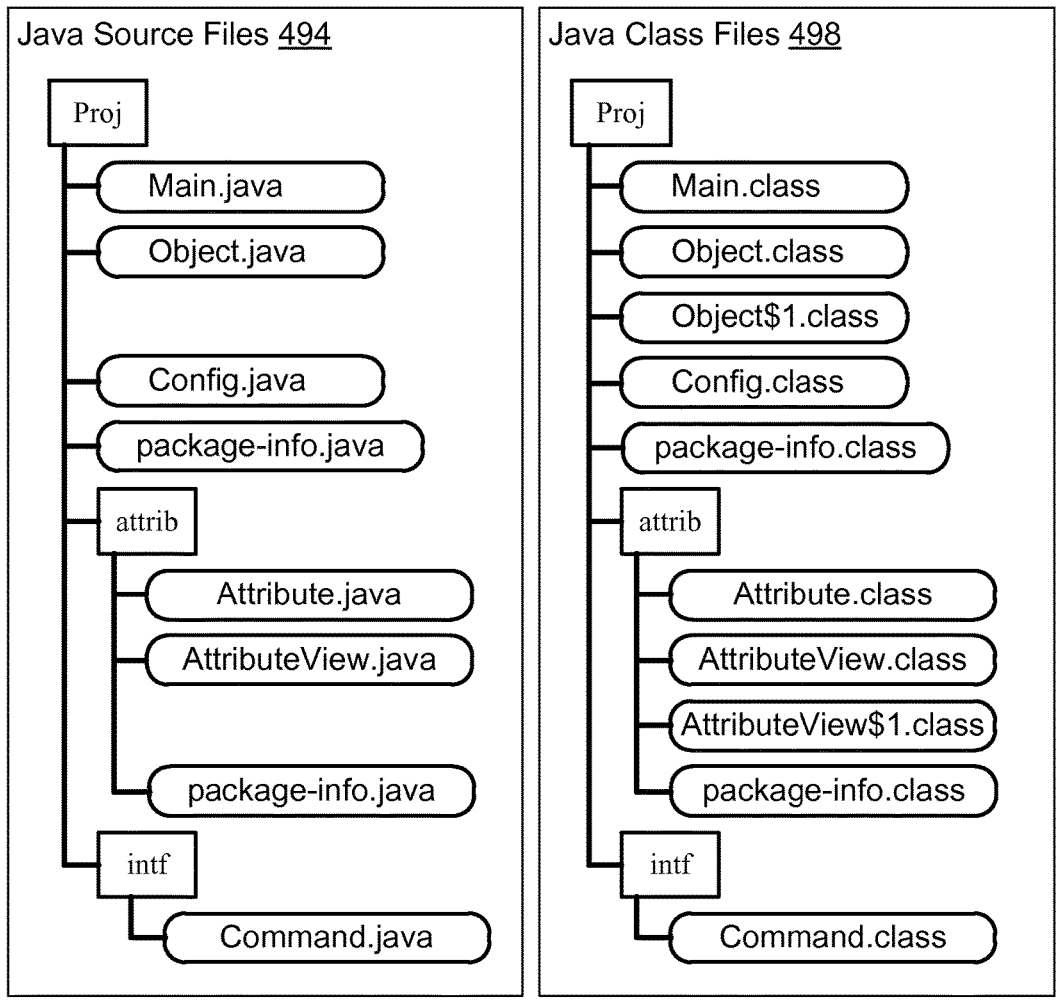
FIG. 4D is an illustration of a Java Constellation string descriptor and signature.

FIGS. 4A-4C illustrate various examples of string descriptors and signatures for the file hierarchy illustrated in the Alfa directory 310 as a root node. The signature type "Deep with Size" is described above in Table 1 and, in some implementations, is defined by specific element selection criteria, an element descriptor component list, and formatting rules for each element descriptor and for aggregating the element descriptors into a "Deep with Size" string descriptor representative of the file hierarchy for a particular root. As indicated in Table 1, each file is named and the respective file size appended. Each sub-directory is recursively expanded. In some implementations, sizes are associated with directories and files. In some implementations, sizes are associated only with files, as illustrated. In some implementations, rules defining an element descriptor component list for each element type indicate if an element type is represented with a name, a name and size, or some other set of element descriptor components. An example signature for the string descriptor 410 is an MD5 digest 412 of the descriptor. In some implementations, the signature 412 and/or the string descriptor in the clear 410 is stored, e.g., in a database at an audit data storage system 148.

FIG. 4A further illustrates a "Deep no Size" string descriptor 420 representing the file hierarchy illustrated in FIG. 3, using the Alfa directory 310 as a root node. The signature type "Deep no Size" is described above in Table 1 and, in some implementations, is defined by specific element selection criteria, an element descriptor component list (different from the "Deep with Size," e.g., omitting size information), and formatting rules for each element descriptor and for aggregating the element descriptors into a "Deep no Size" string descriptor representative of the file hierarchy for a particular root. As shown in Table 1, each file is named and the respective file sizes are omitted. An example signature for the string descriptor 420 is an MD5 digest 422 of the descriptor. The "Deep no Size" signature 422 differs from the "Deep with Size" signature 412 because the file sizes have been omitted from the "Deep no Size" string descriptor 420. Thus both the "Deep no Size" signature 422 and the "Deep with Size" signature 412 are representative of the file hierarchy illustrated in FIG. 3, although with different levels of granularity. In some implementations, the signature 422 and/or the string descriptor in the clear 420 is stored, e.g., in a database at an audit data storage system 148.

FIG. 4A further illustrates a "Shallow with Size" string descriptor 430 representing the file hierarchy illustrated in FIG. 3, using the Alfa directory 310 as a root node. The signature type "Shallow with Size" is described above in Table 1 and, in some implementations, is defined by specific element selection criteria (differing from "Deep with Size," for example, by not selecting contents of sub-directories), an element descriptor component list, and formatting rules for each element descriptor and for aggregating the element descriptors into a "Shallow with Size" string descriptor representative of a particular root directory. Each file is named and the respective file size appended. Each sub-directory is named, but not expanded. An example signature for the string descriptor 430 is an MD5 digest 432 of the descriptor. In some implementations, the signature 432 and/or the string descriptor in the clear 430 is stored, e.g., in a database at an audit data storage system 148.

FIG. 4A further illustrates a "Shallow no Size" string descriptor 440 representing the file hierarchy illustrated in FIG. 3, using the Alfa directory 310 as a root node. The signature type "Shallow no Size" is described above in Table 1 and, in some implementations, is defined by specific element selection criteria, an element descriptor component list (different from the "Shallow with Size," e.g., omitting size information), and formatting rules for each element descriptor and for aggregating the element descriptors into a "Shallow no Size" string descriptor representative of a particular root directory. Each file is named and each sub-directory is named, but the sub-directories are not expanded and file sizes are omitted. An example signature for the string descriptor 440 is an MD5 digest 442 of the descriptor. In some implementations, the signature 442 and/or the string descriptor in the clear 440 is stored, e.g., in a database at an audit data storage system 148.

FIG. 4B illustrates a "Deep Structure" string descriptor 450 representing the file hierarchy illustrated in FIG. 3, using the Alfa directory 310 as a root node. The signature type "Deep Structure" is described above in Table 1 and, in some implementations, is defined by specific element selection criteria (e.g., only directory names), an element descriptor component list, and formatting rules for each element descriptor and for aggregating the element descriptors into a "Structure" string descriptor representative of the directory hierarchy from a particular root. Only the names of sub-directories within the Alfa directory 310 are included, recursively expanding sub-directories. An example signature for the string descriptor 450 is an MD5 digest 452 of the descriptor. In some implementations, the signature 452 and/or the string descriptor in the clear 450 is stored, e.g., in a database at an audit data storage system 148.

FIG. 4B further illustrates a "Shallow Structure" string descriptor 460 representing the file hierarchy illustrated in FIG. 3, using the Alfa directory 310 as a root node. The signature type "Shallow Structure" is described above in Table 1 and, in some implementations, is defined by specific element selection criteria (e.g., only directory names to a depth N), an element descriptor component list, and formatting rules for each element descriptor and for aggregating the element descriptors into a "Structure" string descriptor representative of the directory hierarchy from a particular root. A shallow structure string descriptor is limited to a depth of N tiers of subdirectories. The string descriptor 460 is for a depth of N=1, such that only the names of first tier sub-directories within the Alfa directory 310 are included. The sub-directories are not expanded. An example signature for the string descriptor 460 is an MD5 digest 462 of the descriptor. In some implementations, the signature 462 and/or the string descriptor in the clear 460 is stored, e.g., in a database at an audit data storage system 148. Because the example hierarchy illustrated in FIG. 3 only has a depth of two levels, a "Shallow Structure" string descriptor with a depth of N=2 is the "Deep Structure" string descriptor 450. A depth of N=0 is the root node.

In some implementations, element selection criteria for a string descriptor type may be defined by "include" and/or "exclude" rules, e.g., as one or more regular expressions or filters specifying criteria for inclusion or exclusion of elements. For example, an inclusion rule may specify that only file names satisfying a glob pattern or regular expression are to be included in the string descriptor. The regular expression may be expressed using a particular grammar or standard (e.g., Posix or Perl). Any of the string descriptors described may be configured to exclude files, e.g., to exclude file-system specific files, to exclude document management or revision control files such as Git files, or to exclude temporary or auto-save files. These criteria rules may be expressed in a configuration and/or stored in a control file.

In some implementations, element attributes or metadata to be used in the string descriptor may be specified as element descriptor components, e.g., in an element descriptor component list. Each signature type may be associated with a different element descriptor component list (e.g., some with size and some without size). The representation of each element descriptor component may be controlled by formatting rules, e.g., by a masking rule that controls how much of a file name or directory name to include. For example, a masking rule may be used to remove file extensions from a string descriptor for a data file or an archive file. In some implementations, a masking rule is a regular expression-based text substitution. The element descriptor component lists and formatting rules may be expressed in a configuration and/or stored in a control file.

A string descriptor can be created according to a set of configurable criteria; this type of string descriptor or signature is referred to herein as a "Constellation." The Constellation signature types are introduced above, in Table 1 and in Table 2. A first example is illustrated in FIG. 4C and a Java Constellation example is illustrated in FIG. 4D.

FIG. 4C illustrates a "Constellation" string descriptor, which include only files matching a set of configurable criteria. A "Constellation" string descriptor 480, and example signature 482, is illustrated for criteria to only include files with a "DAT" extension and to not include the file extension (the ".DAT"). In some implementations, the configuration for a constellation string descriptor is stored by an audit data storage system 148. In some implementations, the configuration for a constellation string descriptor is stored as a configuration file. In some implementations, the configuration for a constellation string descriptor is stored in a database. In some implementations, the configuration for a constellation string descriptor is accessed via an application programming interface (API). In some implementations, the configuration for a constellation string descriptor is accessed via a user interface (UI).

FIG. 4D illustrates a "Java Constellation" string descriptor, which include only files matching the set of configurable criteria as specified in Table 2, above. A "Java Constellation" string descriptor 490, and example signature 492, is illustrated representing two distinct file hierarchies 494 and 498. One file hierarchy is a source code tree 494 with example java source code files. A java compiler can compile the source code files 494 into byte code for execution in a Java Virtual Machine; the compiler will create class files as shown in the second file hierarchy 498. The two sets of files 494 and 498 are different files, but they are closely related. The second set of files 498 are java class files created from the java source code files in the first set of files 494. A Java Constellation string descriptor 490 can be created by applying the element selection criteria in the Java Constellation signature described by Table 2, above, to the root directory of the source files 494. The same Java Constellation string descriptor 490 can be created by applying the element selection criteria in the Java Constellation signature described by Table 2, above, to the root directory of the compiled class files 498. Thus the single signature 492, created from the string descriptor 490, is representative of both the source files 494 and the compiled class files 498. The signature is small and compact, particularly in comparison to the file hierarchies. A signature 492 representative of the source files 494 can be quickly and easily compared to a signature 492 representative of the compiled class files 498. The fact that the two file hierarchies 494 and 498 have matching Java Constellation signatures demonstrates the relationship between the two file hierarchies 494 and 498.

Generally, string descriptors and signatures represent a file hierarchy, or a portion of a file hierarchy, as a characterization of metadata for the hierarchy's contents. The string descriptors and signatures presented in Tables 1 and 2 do not represent the actual binary contents of elements. A file's name and size may be the same before and after a change to the file's contents. A more precise signature can be created that also represents the actual binary contents of an element. For example, a signature may be created using the rules shown in Table 3, below.

In some implementations, a "Deep Binary" signature is created according to the rules shown in Table 3, above. The "Deep Binary" signature is an aggregation of hash or digest values for each element in a file hierarchy. Although each hash or digest value has some probability of collision (where two different input values result in the same hash or digest value), it is almost a certainty that if a scan of a real file hierarchy produced a Deep Binary signature equal to a Deep Binary signature for another file hierarchy, then the two file hierarchies are equivalent. The probability of a false positive for this type of comparison is substantially close to zero. In some implementations, Deep Binary signatures are not used either because this level of precision is not needed or desired or because the additional processing time is undesirable. In some implementations, Deep Binary signatures are used in special circumstances, such as to record confirmation of equivalence between two scanned file hierarchies.

As described above, each of the string descriptors and signatures described in Tables 1-3 and illustrated by example in FIGS. 4A-4D may be stored in association with descriptive information about a file hierarchy. For example, referring to FIG. 1, an auditor 140 may record information about directories and files controlled by a host system 120 in an audit data storage system 148 or in an archive file. The information stored may include data about each directory in the file hierarchy, e.g., directory name, number of files, distance from root, and/or other metadata. The information stored generally includes one or more of the signatures (e.g., in hash or digest form) of the types described in Tables 1-3. In some implementations, the information stored also includes one or more string descriptors (a signature "in the clear"). Table 4, below, lists examples of properties that can be stored, e.g., in one or more database tables, for information about directory elements. The information stored may include data about each file in a file hierarchy rooted at the directory, e.g., file name, size, and/or other metadata. In some implementations, a signature or hash of a file's binary data is also stored, in addition to the signatures introduced above. Table 5, below, lists examples of properties that can be stored, e.g., in one or more database tables, for information about file elements.

Table 4, below, lists examples of properties that can be stored, e.g., in one or more database tables, for information about directory elements such as directories and archive files.

TABLE 3

Deep Binary Signatures:

| Nickname | Element Selection Criteria | Element Descriptor Components | Element Descriptor Format | String Descriptor Format |
|---|---|---|---|---|
| "Deep Binary" | Every data file, archive file, and subdirectory, with each subdirectory recursively expanded; i.e.: ** **/* | Data File: Binary Hash Archive: Binary Hash Directory: Name & String Descriptor | Data File: #hashvalue# Archive: #hashvalue# Directory: Name>String Descriptor< Empty Directory: Name>< | Concatenate element descriptors alphanumerically within each directory. |

TABLE 4

Examples of Properties for Directory Elements:

| Property | Description |
| --- | --- |
| Scan ID | Identifier for the scan cataloging this directory |
| Element Name | Directory name |
| Element Path | Path, from scan root, to the directory |
| Parent ID | Identifier for the parent directory for this directory (if there is one) |
| Distance From Root | Distance from the root parent directory, zero means this is the root. |
| Shallow File Count | Number of files in this directory |
| Deep File Count | Number of files in this directory and any sub-directories |
| Signature (Type 1) | The signature for this element of the specified type (see Table 1) |
| Signature (Type 2) | The signature for this element of the specified type (see Table 1) |
| Signature (Type N) | The signature for this element of the specified type (see Table 1) |
| Element Type | Value indicating an element type, e.g., directory, archive file, or data file |
| isArchive | Boolean value indicating if the directory is in an archive |
| Archive Element | Identifier for the archive file entry |

A "Scan ID" is an identifier for each particular scan traversing a file hierarchy, creating the signatures and cataloging the file and directory elements found, as described above. The scan begins at a root node (the directory being scanned). For each directory in the root node, the scan sorts the contents of the directory (the file names and sub-directory names) according to a deterministic sort, e.g., alphanumeric order. In some implementations the ordering is defined within string descriptor formatting rules. In a deep scan, sub-directories are explored recursively. In some implementations, the information stored includes an indicator of Element Type, e.g., whether the element is a directory, a data file, an archive file, or some other type of element. The indicator may be a text string, a typecast value, a number, or any other indicator distinguishing different element types.

A file hierarchy being scanned may be an archived set of files, e.g., files compressed into a ZIP file or bundled in a TAR file. In some implementations, the information stored may include a Boolean value ("isArchive") for a file hierarchy within an archive. In some implementations, a reference is recorded to the archive file itself (the "Archive Element"). When scanning a file hierarchy that includes an archive file, the archive file is treated as a file from the perspective of the directory in which it resides and then scanned separately as a new file hierarchy with its own root node internal to the archive. Thus the archive may be recorded both as a file element (as an archive file) and separately as a directory element. In some implementations, the contents of an archive are traversed while recursively expanding the directory where the archive file resides.

As a file hierarchy is scanned, each data file, archive file, and sub-directory is recorded as an element in the file hierarchy. The element's name (file name, archive name, or directory name) is recorded as an "Element Name" and, in some implementations, a path to the root node ("Element Path") is recorded. A directory's file count may be recorded as one or both of a count of the number of data files and archive files present in the directory ("Shallow File Count") and a count of the number of data files and archive files present in the directory and all sub-directories ("Deep File Count"). In some implementations, a directory's file count omits archive files. In some implementations, a directory's file count includes a count of sub-directories. In some implementations, a directory has an "Element Count" for the number of elements present in the directory or in the directory and sub-directories.

The first directory scanned is a root node for the directory tree. A "Distance from Root" property may be recorded for each directory indicating its separation from the first directory of the scan. The root directory itself has a distance of 0, an immediate sub-directory of the root has a distance of 1, sub-directories of those directories have a distance of 2, and so forth. Each directory may serve as a root directory for its sub-directories. A particular sub-directory may be chosen as a root node for a scan, e.g., where the directory is the parent of a logical grouping of files such as the root of a source code tree, a software installation package, or of an archive file. Where the directory is within an archive, a "DistanceFromInnerRoot" property may be recorded indicating the number of parent directories to reach the root directory of the archive. An archive file may be nested within another archive file (e.g., a tar.gz file containing a zip file containing a jar file). The inner root directory of an archive is the top root of the inner most archived directory (e.g., the root of the directories in the jar file). In some implementations, an attribute is recorded for an archived directory specifying the extent of nesting between the archived directory and the outermost archive file.

Information for each directory is stored in association with one or more signatures for the directory. As described above, in reference to Table 1, various string descriptors (signatures "in the clear") may be created for a directory and a digest or hash of the string descriptors may be created for use as a signature of the directory. In some implementations, only the digest or hash signatures are stored. In some implementations, a combinations of signatures in the clear and digest or hash signatures are stored. For example, in some implementations, each directory is stored in association with: a "Deep with Size" digest signature; a "Deep no Size" digest signature, a "Deep Structure" digest signature; a "Shallow with Size" string descriptor signature in the clear (depth N=1); a "Shallow with Size" digest signature (depth N=1); a "Shallow no Size" string descriptor signature in the clear (depth N=1); and a "Shallow no Size" digest signature (depth N=1). Each of these signatures (in the clear or in digest or hash form) can be used as a fingerprint for the directory with which it is associated.

Each directory's parent directory is recorded ("Parent ID"). In some implementations, the parent directory is recorded as a key or unique identifier for the parent directory's entry in the data. In some implementations, a directory may be recorded as having multiple parents—where each of the multiple parent directories has an equivalent instance of the directory. For example, in some implementations, when entering a newly scanned directory into the data storage, a signature for the newly scanned directory may be compared to comparable signatures of the same type for previously scanned and stored directories. That is, a "Deep with Size" signature is compared with previously stored "Deep with Size" signatures. If there is a match, the existing entry is updated to include a reference to the parent of the newly scanned directory. This results in compression of the data storage for representation of file hierarchies. A highly redundant file hierarchy with many duplicate sub-directories may include smaller entries with internal references rather than repetition of numerous signatures.

The type of signature used in a comparison for compressing data storage has implications on the similarity or equivalence of hierarchies—using a "Deep Binary" signature (see Table 3, above) effectively ensures equivalence while using "Deep with Size" signatures (see Table 1, above) is less precise and using other signatures may only indicate a degree of similarity rather than a likelihood of equivalence. The degree of similarity implied by the selected signature type defines a degree of lossiness for compression of the storage. That is, where non-equivalent file hierarchies have matching signatures (e.g., matching "Structure Only" signatures), reliance on the signature match for compression will introduce some amount of information loss. Thus the type of signature used will determine a lossiness for compression of the data representing the file hierarchy. In some implementations, when a file hierarchy has a "Deep with Size" signature matching a "Deep with Size" signature in the data store, a Deep Binary signature is created and stored for use in confirming the equivalence.

Table 5, below, lists examples of properties that can be stored, e.g., in one or more database tables, for information about file elements such as data files and archive files.

TABLE 5

Examples of Properties for File Elements:

| Property | Description |
|---|---|
| Scan ID | Identifier for the scan cataloging this file |
| Element Name | File name |
| Element Path | Path, from scan root, to the file |
| Parent ID | Identifier for the parent directory for this file |
| Distance From Root | Distance from the root parent directory, zero means parent is the root. |
| File Size | If element is a file, size of the file |
| Element Type | Value indicating an element type, e.g., directory, archive file, or data file |
| isArchive | Boolean value indicating if the file is an archive |

As described above, a "Scan ID" is an identifier for each particular scan traversing a file hierarchy. For each directory element (e.g., sub-directory or archive file) identified during the scan, a record may be created and stored as described above. For each file element (e.g., data file or archive file) identified during the scan, a record may be created and stored. Properties of the identified file that may be recorded include, as indicated in Table 4, any combination of: the "Scan ID"; the file name ("Element Name"); a path to the file from the root directory ("Element Path"); an identifier for the directory in which the file resides ("Parent ID"), which may be a identifier or key to an entry for the parent directory; a number of directories separating the file from the root node ("Distance From Root"), and a size of the file ("File Size"). In some implementations, the information stored includes an indicator of Element Type, e.g., whether the element is a directory, a data file, an archive file, or some other type of element. The indicator may be a text string, a typecast value, a number, or any other indicator distinguishing different element types. In some implementations, the information stored for a file element may include a Boolean value ("isArchive") indicating whether or not the file is itself an archive of a file or file hierarchy, e.g., if the file is a ZIP file or a TAR file. In some implementations, a digest or hash of the binary contents of the file is also recorded, although this is distinct from the signatures described above in reference to Tables 1 and 2.

The scan data may be stored in a compact manner. Some files or groups of files may be repeated within a file hierarchy with little or no change. Some files or groups of files may be seen by an auditor in multiple hosts or during multiple scans. FIG. 4 illustrates two examples, with three separate uses of the file names Foxtrot.DAT and Golf.DAT, 330, 344, 330'. In two instances 330, 330', the files Foxtrot.DAT and Golf.DAT retain the same respective file sizes (1259 and 3511). In a third instance 344, only the file labeled Golf.DAT has a different file size (5167) suggesting that the set of files 344 are related to the other two instances 330, 330', although Golf.DAT has been modified. The relationships between these instances of repetition can be used to compact storage of the scan representing the file hierarchy.

Figure 5:
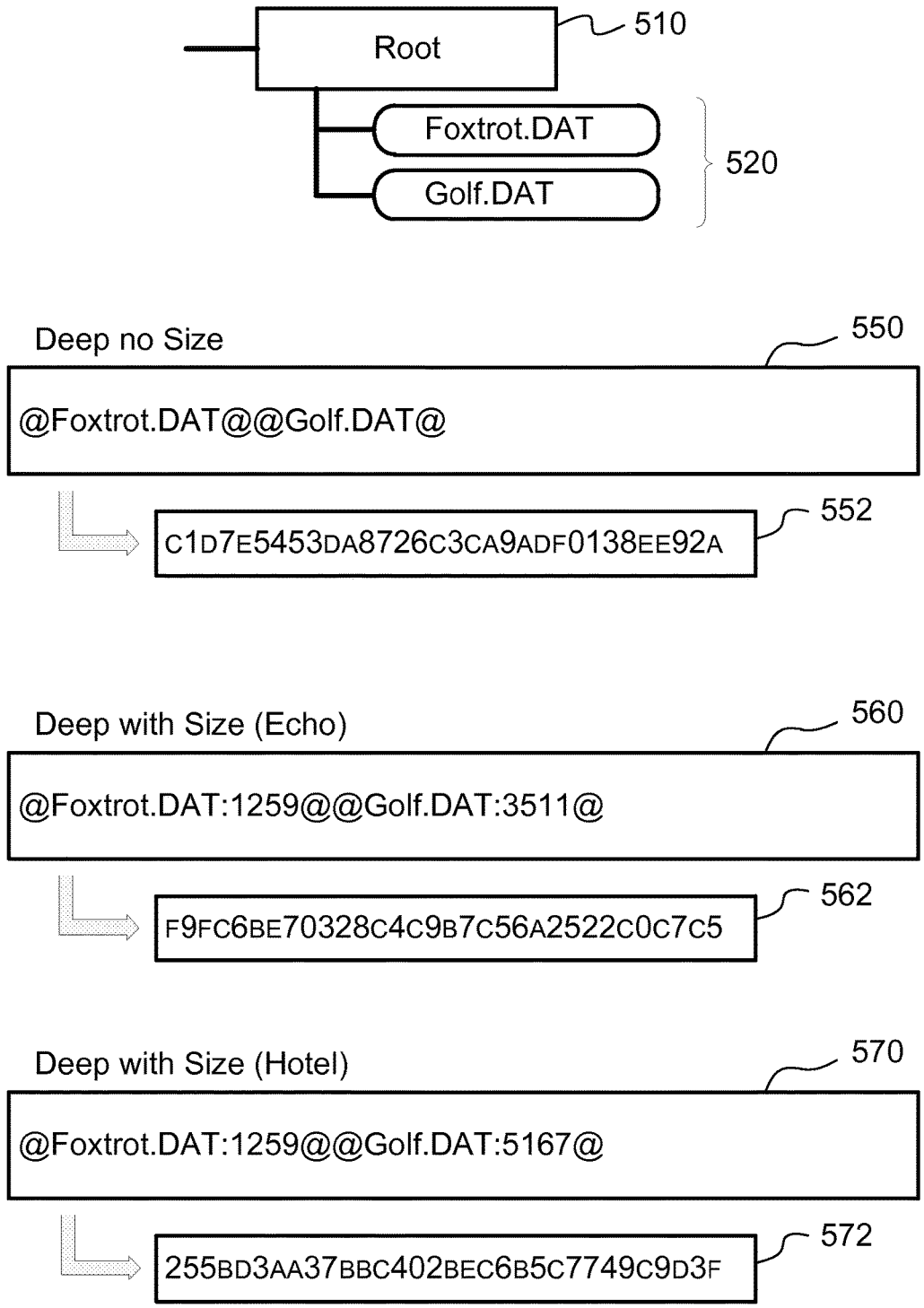
FIG. 5 is an illustration of string descriptors and signatures for specific sub-directories of the example file hierarchy of FIG. 3.

FIG. 5 illustrates string descriptors for some of the sub-directories illustrated in FIG. 3. A root directory 510 has two files 520, Foxtrot.DAT and Golf.DAT. This pattern of a root directory with two files with these file names appears in three places (330, 344, and 330') in the file hierarchy illustrated in FIG. 3. FIG. 5 illustrates a "Deep no Size" string descriptor 550 and MD5 digest 552 for the root directory 510. These signatures (in the clear 550 and in digest form 552) are the same for each of the three instances (330, 344, and 330') in FIG. 3. FIG. 5 illustrates a "Deep with Size" string descriptor 560 and MD5 digest 562 for the two instances (330 and 330') in FIG. 3 where the file sizes are the same and a "Deep with Size" string descriptor 570 and MD5 digest 572 for the one instance (344) in FIG. 3 where the file sizes are the different.

In two instances (330 and 330'), the Deep with Size signatures (in the clear 560 or as a digest 562) are the same. The second instance may be recorded by setting a second parent for the first instance. No new entries need to be created to represent deeper subdirectories or files, as they are present in the first instance. This allows for a compact representation in storage of the scan.

In all three instances (330, 344, and 330'), the Deep no Size signatures (in the clear 550 and in digest form 552) are the same. An auditor can detect that each of these instances has the same Deep no Size signature and determine that there is a relationship between them. For example, the auditor can identify the set of three instances with the same Deep no Size signature 552 and compare (for the instances in the set) the Deep with Size signatures 562 and 572—detecting that two instances (330 and 330') are equivalent and that a file size is different for the third instance 344.

Figure 6:
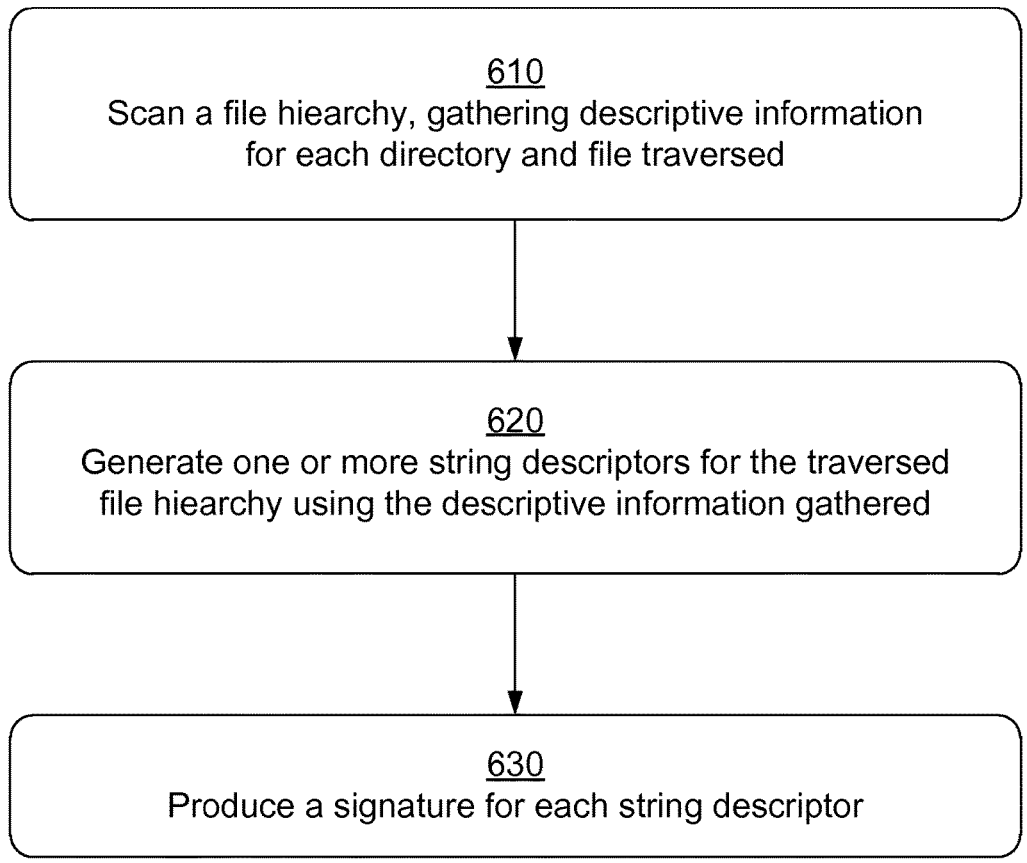
FIG. 6 is a flowchart illustrating a method of producing one or more signatures.

FIG. 6 is a flowchart illustrating a method of producing one or more signatures for a set of files. In brief overview, an auditor (e.g., an auditing system) scans a file hierarchy and gathers descriptive information for each directory and file in the hierarchy (step 610). The auditor generates one or more string descriptors for the traversed file hierarchy using the descriptive information gathered (step 620). The auditor produces a signature for each generated string descriptor (step 630). These signatures are representative of the file hierarchy traversed during the scan at step 610. In some implementations, the signatures are recorded in persistent storage.

In more detail, the method illustrated in FIG. 6 begins with an auditor, e.g., the auditor 140 illustrated in FIG. 1, scanning a file hierarchy and gathering descriptive information for each directory and file in the hierarchy (step 610). The auditor 140 may traverse the hierarchy in a depth first manner. The auditor 140 may traverse the hierarchy in a breadth first manner. Generally, each directory contains zero or more elements, e.g., data files, archive files, and sub-directories. For each directory traversed, the auditor 140 gathers descriptive information about any sub-directories and descriptive information about any files. For example, the auditor may gather information for elements satisfying the element selection criteria for the signature or signatures to be generated. In some implementations, the auditor gathers only the information indicated by one or more element descriptor component lists for the signatures to be generated. In some implementations, more information is gathered than is needed for the signatures (e.g., in anticipation of storing the information for future use). The gathered information may be persistently stored in a database, e.g., at an audit data storage system 148. The gathered information may be used to form signatures and then discarded. In some implementations, some of the information gathered is retained while other information is discarded.

The auditor generates one or more string descriptors for the traversed file hierarchy using the descriptive information gathered (step 620). The string descriptors are representations of the descriptive information, as described above in reference to the examples illustrated in FIGS. 4A-4D. A string descriptor represents a file hierarchy from the perspective of a root node. A second string descriptor can be created to represent a sub-directory of a file hierarchy, treating that sub-directory as a root node for that second string descriptor. Multiple string descriptors are created for the same file hierarchy, each string descriptor representing a different quantity of the gathered descriptive information. Table 1, above, provides illustrative string descriptor combinations as examples. In some implementations, if a file is identified as an archive of a file hierarchy, a separate scan may be conducted of the archived file hierarchy. The archive itself is a file (e.g., a ZIP file or a TAR file) and is treated as an archive file as described above. That is, it may be recorded in a data store as an archive file and included in string descriptors according to the creation rules (e.g., as shown in Table 1) for elements of type archive file.

The auditor produces a signature for each generated string descriptor (step 630). The signature may be produced by generating a hash or digest value for the string descriptor generated at step 620. The hash or digest value may be generated may be calculating a cyclic redundancy check, a message digest, an MD5 hash function, a cryptographic hash, or a non-cryptographic hash function, as described above. A file hierarchy represented by multiple string descriptors is associated with the signatures produced for each of the string descriptors. Thus a single file hierarchy may have multiple signatures. A string descriptor itself is a signature "in the clear." In some implementations, a signature is produced by calculating a digest or hash value for a string descriptor, as described above.

Generally, each of the signatures produced using the flowchart of FIG. 6 is associated with, and representative of, the file hierarchy traversed in the scan at step 610. In some implementations, signatures are produced for multiple sub-directories in a file hierarchy, each sub-directory treated as a root node for the respective signatures. For example, the string descriptors and signatures in FIG. 5 treat sub-directories as roots. The signatures are generally stored in association with additional information about the file hierarchy traversed, as described above in reference to Tables 4 and 5. For example, the signatures may be stored by an audit data storage system 148, as illustrated in FIG. 1. In some implementations, the storage of information representing one or more file hierarchies uses the signature data to store the information compactly.

Figure 7:
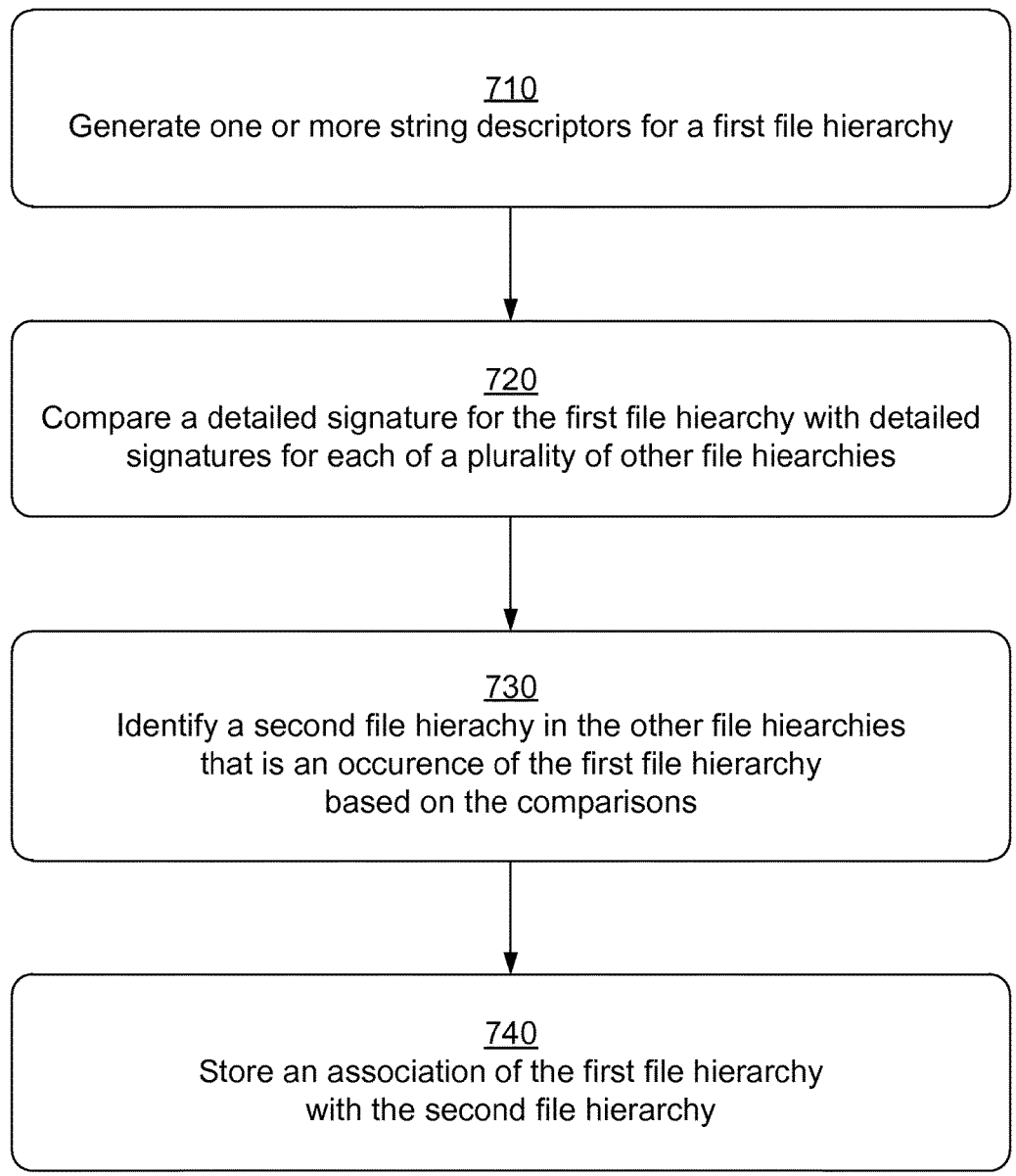
FIG. 7 is a flowchart illustrating a method for compact representation of a file hierarchy.

FIG. 7 is a flowchart illustrating a method for compact representation of a file hierarchy. In brief overview, an auditor, e.g., the auditor 140 illustrated in FIG. 1, generates one or more string descriptors for a first file hierarchy, e.g., using the method illustrated in FIG. 6 (step 710). The auditor compares a signature for the first file hierarchy with a signature of the same type (e.g., "Deep with Size") for each of a plurality of other file hierarchies in a data store (step 720). The auditor identifies a second file hierarchy in the other file hierarchies that is sufficiently similar to the first file hierarchy to be treated as an occurrence thereof, based on the step 720 comparisons (step 730). The auditor stores an association of the first file hierarchy with the second file hierarchy in the data store (step 740).

In more detail, the method illustrated in FIG. 7 begins with an auditor, e.g., auditor 140, generating one or more string descriptors for a first file hierarchy (step 710). For example, the auditor 140 may scan or traverse a file hierarchy as described in reference to FIG. 6. The auditor identifies the descriptive information needed to generate the one or more string descriptors. The string descriptors may be of the forms described above in reference to Tables 1-3 and illustrated in FIGS. 4A-4D. In some instances, the string descriptors are an index of the first file hierarchy. The first file hierarchy may be a set of files at a host computing device 120. The first file hierarchy may be components of a software project, e.g., source code, compiled libraries, and related data files. The first file hierarchy may be materials subject to limitations on replication. The auditor may generate string descriptors of different descriptive information for the file hierarchy such that the string descriptors are of different granularities.

The auditor compares a signature for the first file hierarchy with a signature (of the same type) for each of a plurality of other file hierarchies in a data store, i.e., the data store for hosting file hierarchy information (step 720). For example, in some implementations, the detailed signature type is the "Deep with Size" signature type described above in reference to Table 1.

The auditor identifies a second file hierarchy in the other file hierarchies that is sufficiently similar to the first file hierarchy to be treated as an occurrence thereof, based on the step 720 comparisons (step 730). If the auditor locates previous scan of a file hierarchy that resulted in the same signature value (for the specific type of signature compared), then the two instances are likely related. In some implementations, having the same "Deep with Size" signature is sufficient to conclude that the two instances are equivalent. As described above, the degree of similarity implied by the selected signature type defines a degree of lossiness for compression of the storage. In some implementations, additional comparisons are used to validate the equivalence.

The auditor stores an association of the first file hierarchy with the second file hierarchy in the data store (step 740). That is, instead of creating an entire new entry, the information that is the same is associated with both file hierarchies. This results in a more compact representation in the data store. In some implementations, a representation is stored for a directory with multiple parent directories—one for each instance where the file hierarchy represented was identified.

The compact representation of file hierarchies using signatures, as illustrated in FIG. 7, may be used to create a compact index. In some implementations, a file aggregator or archive system uses the compact representation of a file hierarchy in building an index for aggregated or archived files. The file aggregator or archive system identifies redundancies within a file hierarchy, e.g., using comparisons as described herein, and achieves improved compression by including only a first instance of each redundant file in an aggregation package or archive file.

The compact representation of file hierarchies using signatures, as illustrated in FIG. 7, may be used to create a catalog of file sets. In some implementations, an audit system accesses a data store hosting a catalog of signatures associated with various file sets. The audit system can compare signatures for a subject file hierarchy to signatures in the catalog and determine if the subject file hierarchy is equivalent to, or related to, any of the file sets represented in the catalog. Each signature comparison is between two signatures of the same type, e.g., the types illustrated in Table 1.

Figure 8:
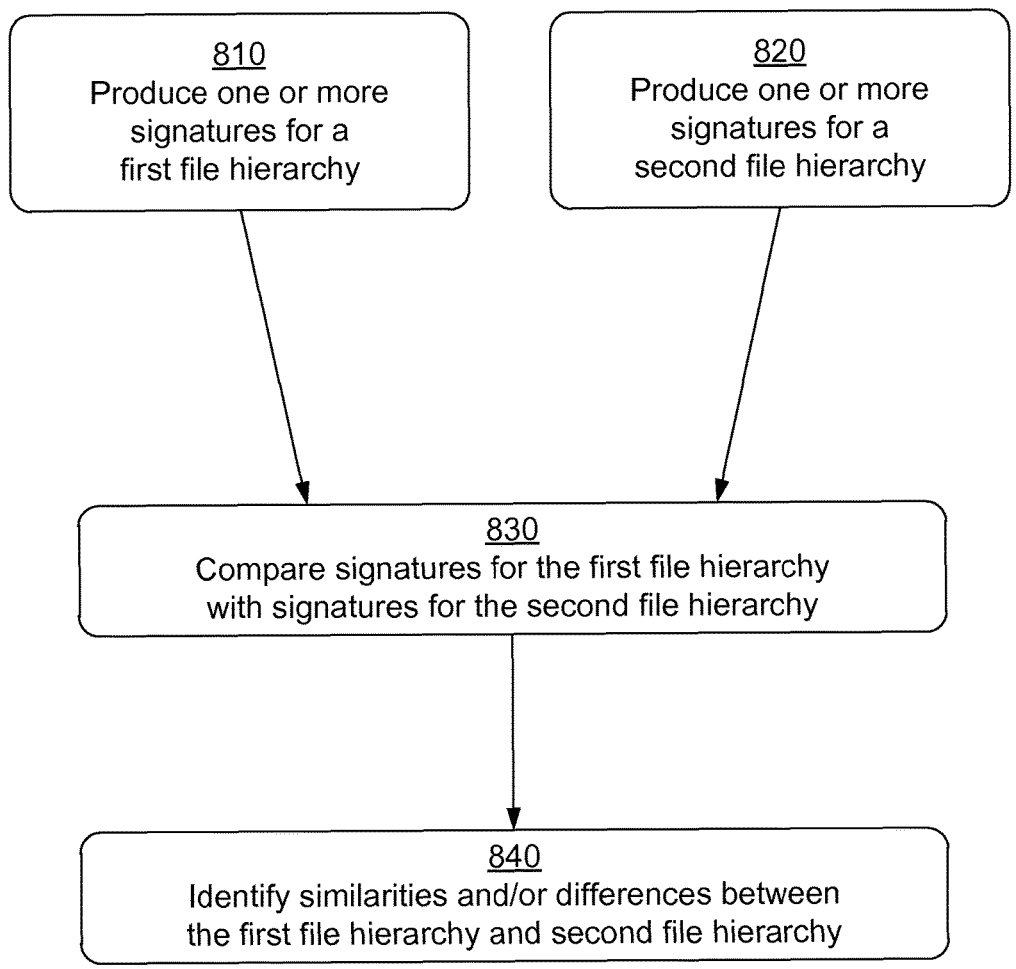
FIG. 8 is a flowchart illustrating a method for comparing file hierarchies.

FIG. 8 is a flowchart illustrating a method for comparing file hierarchies. In brief overview, an auditor produces one or more signatures for a first file hierarchy at step 810 and for a second file hierarchy at step 820. An auditor compares these signatures for the first file hierarchy with signatures for the second file hierarchy (step 830) and identifies similarities and/or differences between the first file hierarchy and the second file hierarchy (step 840).

In more detail, the method illustrated in FIG. 8 begins with an audit system, e.g., an auditor 140 as shown in FIG. 1, producing one or more signatures for a first file hierarchy (step 810). Generally, the signatures produced represent information about the first file hierarchy at various levels of granularity. Any of the signatures described herein may be produced at step 810. In some implementations, the signatures are produced locally at a host computing system 120. In some implementations, an auditor 140 connects to a host computing system 120, e.g., via a network 110, and analyzes data stored by the host computing system 120, e.g., at a host data storage system 128. The signatures produced at step 810 are representative of the data analyzed. The signatures may be stored by the auditor, e.g., at an audit data storage system 148.

An auditor, e.g., an auditor 140, produces one or more signatures for a second file hierarchy (step 820). Generally, the production of signatures at 820 is the same as the production in step 810, only applied to either a different file system (or portion of the file system) than in step 810 or applied to the same file system but at a different time than in step 810. Steps 810 and 820 may occur at different times and may be performed by different auditors.

An auditor, e.g., an auditor 140, compares signatures for the first file hierarchy with signatures for the second file hierarchy (step 830). The signatures compared are those produced in steps 810 and 820. The auditor performing step 830 may be the same auditor as in step 810 and/or step 820, or may be a different auditor. In some implementations, an auditor performs step 810 in an ongoing manner across many file hierarchies and builds a database or collection of string descriptors and signatures. When the auditor performs step 830, the file hierarchy traversed at step 820 is compared to the database or collection built in step 810. Generally, as described herein, the auditor compares signatures of the same type, such that they have equivalent levels of granularity, and detects where the signatures match or do not match.

The auditor identifies similarities and/or differences between the first file hierarchy and the second file hierarchy based on the step 830 comparison of signatures (step 840). Generally, differences between two sets of files may be identified when some signatures match and other signatures do not match. The different matches direct efficient identification of the distinctions between the two sets of files and allow for rapid identification of relationships and isolation of differences. The auditor uses the comparisons of step 830 to efficiently identify sub-sets of files that match and sub-sets of files that do not match. This analysis uses various properties of the signatures as described herein.

It should be understood that the systems and methods described above may be provided as instructions in one or more computer programs recorded on or in one or more articles of manufacture, e.g., computer-readable media. The article of manufacture may be a floppy disk, a hard disk, an optical disc such as CD-ROM, DVD-ROM, or Blu Ray, a flash memory card, a portable memory chip such as used in a USB "thumb" drive, a PROM, a RAM, a ROM, or a magnetic tape. It is understood that these articles of manufacture record data, including computer program instructions, in a non-transitory manner. In general, the computer programs may be implemented in any programming language, such as LISP, Perl, Ruby, C, C++, C#, PROLOG, or in any byte code language such as JAVA. The software programs may be stored on or in one or more articles of manufacture as object code.

While this specification contains many specific implementation details, these should not be construed as limitations on the scope of any contribution or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Having described certain implementations of methods and systems, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A method for representing a set of data files, the method comprising: scanning, by an audit system comprising at least one computing processor, a file hierarchy comprising a root directory and a plurality of elements, wherein each element is one of a directory, a data file, or an archive file;

identifying, by the audit system, from the scanned plurality of elements, a set of identified elements satisfying an element selection criterion;

generating, by the audit system, a plurality of signatures representative of the set of identified elements by:

creating, by the audit system, for each identified element of the set of identified elements:

a first element descriptor and a second element descriptor, wherein:

(i) the first element descriptor comprises a first text string of a first set of one or more element component values representative of the identified element, and (ii) the second element descriptor comprises a second text string of a second set of one or more element component values representative of the identified element, wherein:

the second set of element component values is different from the first set of element component values, the second text string is different from the first text string for the element, and each element descriptor is formatted according to one or more string descriptor formatting rules;

generating, by the audit system, a first signature from a first string descriptor comprising a first deterministic aggregation of the first element descriptors created for the set of identified elements of the file hierarchy;

generating, by the audit system, a second signature from a second string descriptor comprising a second deterministic aggregation of the second element descriptors created for the set of identified elements of the file hierarchy, wherein the second deterministic aggregation has the same size as the first deterministic aggregation irrespective of any size difference between the first element descriptors and the second element descriptors;

comparing, by the audit system, the first signature with the second signature; and outputting, by the audit system, audit data comprising at least one entry comprising at least one of the first signature the second signature, and a result of the comparing.

2. The method of claim 1, comprising persisting the plurality of signatures in a data store in association with metadata for the root directory.

3. The method of claim 1, wherein the element selection criterion is satisfied by a first element having a name:

in a list of names to include, not in a list of names to exclude, matched by a regular expression for names to include, or not matched by a regular expression for names to exclude.

4. The method of claim 1, comprising creating the first element descriptor with element component values including at least one of: a data file name, an archive file name, or a directory name.

5. The method of claim 4, comprising identifying, for a first element in the identified elements, a corresponding distance from the root directory, and including, in the first element descriptor, a text string of the distance from the root directory formatted according to the one or more string descriptor formatting rules.

6. The method of claim 1, wherein the set of identified elements includes a directory, and wherein the first element descriptors include a string descriptor for corresponding to a scan of the directory.

7. The method of claim 1, wherein the element selection criterion and the one or more string descriptor formatting rules are specified in configuration data stored in a computer readable medium accessible by the at least one computing processor.

8. The method of claim 1, wherein the first deterministic aggregation comprises ordering the first string descriptors created for the set of identified elements alphanumerically.

9. The method of claim 1, wherein generating the first signature comprises calculating a hash value of the first string descriptor.

10. The method of claim 9, comprising calculating the hash value using at least one of: a cyclic redundancy check, a message digest, an MD5 hash function, a cryptographic hash, or a non-cryptographic hash function.

11. A system comprising one or more computing processors and memory storing instructions causing the one or more processors to:

scan a file hierarchy comprising a root directory and a plurality of elements, wherein each element is one of a directory, a data file, or an archive file;

identify, from the scanned plurality of elements, a set of identified elements satisfying an element selection criterion; and generate a plurality of signatures representative of the set of identified elements by:

creating, for each of the identified elements, a first element descriptor and a second element descriptor, wherein:

(i) the first element descriptor comprises a first text string of a first set of one or more element component values representative of the identified element, and (ii) the second element descriptor comprises a second text string of a second set of one or more element component values representative of the element, wherein:

the second set of element component values is different from the first set of element component values, the second text string is different from the first text string for the element, and each element descriptor is formatted according to one or more string descriptor formatting rules;

generating a first signature from a first string descriptor comprising a first deterministic aggregation of the first element descriptors created for the set of identified elements of the file hierarchy;

generating a second signature from a second string descriptor comprising a second deterministic aggregation of the second element descriptors created for the set of identified elements of the file hierarchy, wherein the second deterministic aggregation has the same size as the first deterministic aggregation irrespective of any size difference between the first element descriptors and the second element descriptors;

comparing, by the audit system, the first signature with the second signature; and outputting, by the audit system, audit data comprising at least one entry comprising at least one of the first signature, the second signature, and a result of the comparing.

12. The system of claim 11, the instructions comprising instructions to persist the plurality of signatures in a data store in association with metadata for the root directory.

13. The system of claim 11, wherein the element selection criterion is satisfied by a first element having a name:
- in a list of names to include,
- not in a list of names to exclude,
- matched by a regular expression for names to include, or
- not matched by a regular expression for names to exclude.

14. The system of claim 11, wherein creating the first element descriptor comprises creating the first element descriptor with element component values including at least one of: a data file name, an archive file name, or a directory name.

15. The system of claim 14, the instructions comprising instructions to
- identify, for a first element in the identified elements, a corresponding distance from the root directory, and
- include, in the first element descriptor, a text string of the distance from the root directory formatted according to the one or more string descriptor formatting rules.

16. The system of claim 11, wherein the set of identified elements includes a directory, and wherein the first element descriptors include a string descriptor corresponding to a scan of the directory.

17. The system of claim 11, wherein the element selection criterion and the one or more string descriptor formatting rules are specified in configuration data stored in a computer readable medium accessible by the one or more computing processors.

18. The system of claim 11, wherein generating the first signature comprises calculating a hash value of the first string descriptor.

19. A non-transitory computer-readable medium storing instructions for execution by a computing system comprising one or more computing processors, execution of the instructions causing the computing system to:
- scan a file hierarchy comprising a root directory and a plurality of elements, wherein each element is one of a directory, a data file, or an archive file;
- identify, from the scanned plurality of elements, a set of identified elements satisfying an element selection criterion; and
- generate a plurality of signatures representative of the set of identified elements by:
  - creating, for each of the identified elements, a first element descriptor and a second element descriptor, wherein:
    - (i) the first element descriptor comprises a first text string of a first set of one or more element component values representative of the identified element, and
    - (ii) the second element descriptor comprises a second text string of a second set of one or more element component values representative of the element, wherein:
      - the second set of element component values is different from the first set of element component values,
      - the second text string is different from the first text string for the element, and
      - each element descriptor is formatted according to one or more string descriptor formatting rules;
  - generating a first signature from a first string descriptor comprising a first deterministic aggregation of the first element descriptors created for the set of identified elements of the file hierarchy;
  - generating a second signature from a second string descriptor comprising a second deterministic aggregation of the second element descriptors created for the set of identified elements of the file hierarchy, wherein the second deterministic aggregation has the same size as the first deterministic aggregation irrespective of any size difference between the first element descriptors and the second element descriptors;
  - comparing, by the audit system, the first signature with the second signature; and
  - outputting, by the audit system, audit data comprising at least one entry comprising at least one of the first signature, the second signature, and a result of the comparing.

20. The non-transitory computer readable medium of claim 19, further storing computer readable specifications of the element selection criterion and of the one or more string descriptor formatting rules.

* * * * *